(12) United States Patent
Kasuga et al.

(10) Patent No.: US 9,180,746 B2
(45) Date of Patent: Nov. 10, 2015

(54) VEHICLE HEIGHT ADJUSTING DEVICE AND VEHICLE HEIGHT ADJUSTING METHOD

(71) Applicant: SHOWA CORPORATION, Gyoda-shi (JP)

(72) Inventors: Takahiro Kasuga, Haga-gun (JP); Fumiaki Ishikawa, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/226,065

(22) Filed: Mar. 26, 2014

(65) Prior Publication Data

US 2015/0076773 A1    Mar. 19, 2015

(30) Foreign Application Priority Data

Sep. 19, 2013   (JP) .................................. 2013-194564

(51) Int. Cl.
*B60G 17/052*    (2006.01)
*B60G 17/015*    (2006.01)
*B62K 25/04*     (2006.01)
*B60G 17/027*    (2006.01)

(52) U.S. Cl.
CPC .......... *B60G 17/015* (2013.01); *B60G 17/0155* (2013.01); *B60G 17/0272* (2013.01); *B60G 17/0525* (2013.01); *B62K 25/04* (2013.01); *B60G 2300/12* (2013.01); *B60G 2400/208* (2013.01); *B60G 2400/252* (2013.01); *B60G 2400/60* (2013.01); *B60G 2401/17* (2013.01); *B60G 2500/30* (2013.01); *B60G 2500/302* (2013.01); *B60G 2800/914* (2013.01); *B62K 2025/045* (2013.01)

(58) Field of Classification Search
USPC .......................... 280/5.5, 5.504, 5.507, 5.514
See application file for complete search history.

(56) References Cited

U.S. PATENT DOCUMENTS

| | | | | |
|---|---|---|---|---|
| 5,101,923 | A * | 4/1992 | Odagi et al. .................. | 180/219 |
| 5,211,420 | A * | 5/1993 | Iwashita .................... | 280/5.503 |
| 7,722,056 | B2 * | 5/2010 | Inoue et al. ................. | 280/5.512 |
| 8,262,100 | B2 * | 9/2012 | Thomas ..................... | 280/5.514 |
| 8,496,096 | B2 * | 7/2013 | Mochizuki ................... | 188/313 |
| 8,757,636 | B2 * | 6/2014 | Kasuga et al. ............. | 280/6.152 |
| 8,763,639 | B2 * | 7/2014 | Cook et al. ............... | 137/625.37 |
| 8,783,695 | B2 * | 7/2014 | Murakami et al. ......... | 280/5.514 |
| 8,864,146 | B2 * | 10/2014 | Murakami et al. ......... | 280/6.157 |
| 8,888,107 | B2 * | 11/2014 | Murakami et al. ......... | 280/6.157 |
| 2002/0152763 | A1 * | 10/2002 | Murase et al. ............... | 62/323.1 |
| 2014/0001716 | A1 | 1/2014 | Murakami et al. | |
| 2014/0316652 | A1 * | 10/2014 | Ericksen et al. ............... | 701/37 |

FOREIGN PATENT DOCUMENTS

| | | |
|---|---|---|
| JP | 08-22680 B | 3/1996 |
| JP | 2014-8889 A | 1/2014 |

* cited by examiner

*Primary Examiner* — Nicole Verley
(74) *Attorney, Agent, or Firm* — Leason Ellis LLP

(57) ABSTRACT

A vehicle height adjusting device includes: a changing unit that changes relative positions of a vehicle main body and wheels of a vehicle; and a control unit that adjusts a vehicle height that is a height of the vehicle main body by controlling the changing unit to change the relative positions, in which the changing unit includes an electromagnetic valve that is provided on a circulation path of a fluid and that is adjusted to have an opening amount in accordance with supplied power and changes the relative positions as pressure of the fluid varies in accordance with the opening amount of the electromagnetic valve, and the control unit performs Pulse-Width-Modulation control on voltage applied to the electromagnetic valve so that the opening amount of the electromagnetic valve equals a desired opening amount.

12 Claims, 25 Drawing Sheets

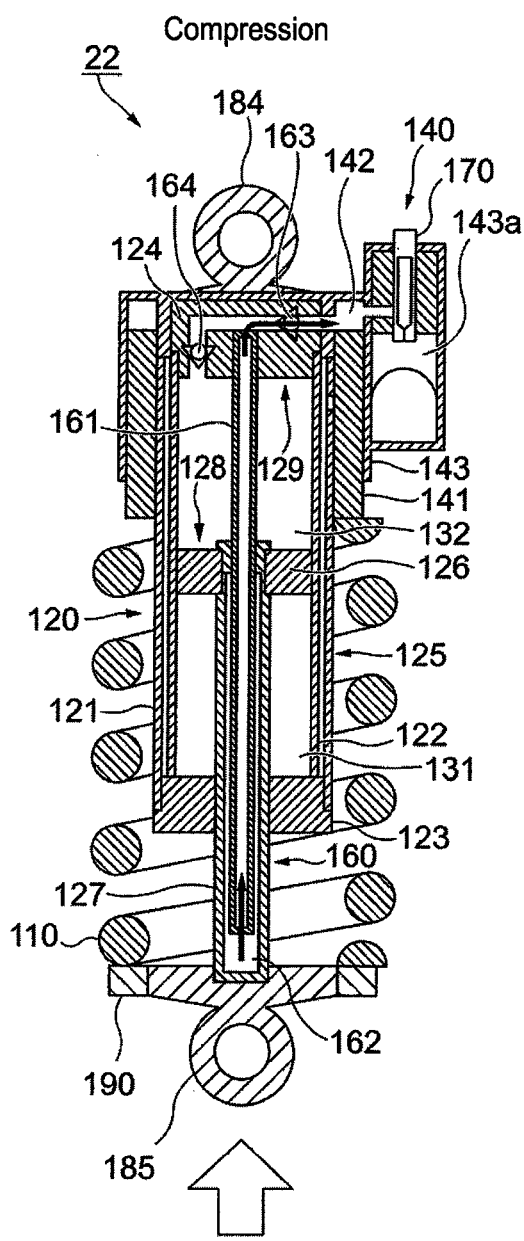
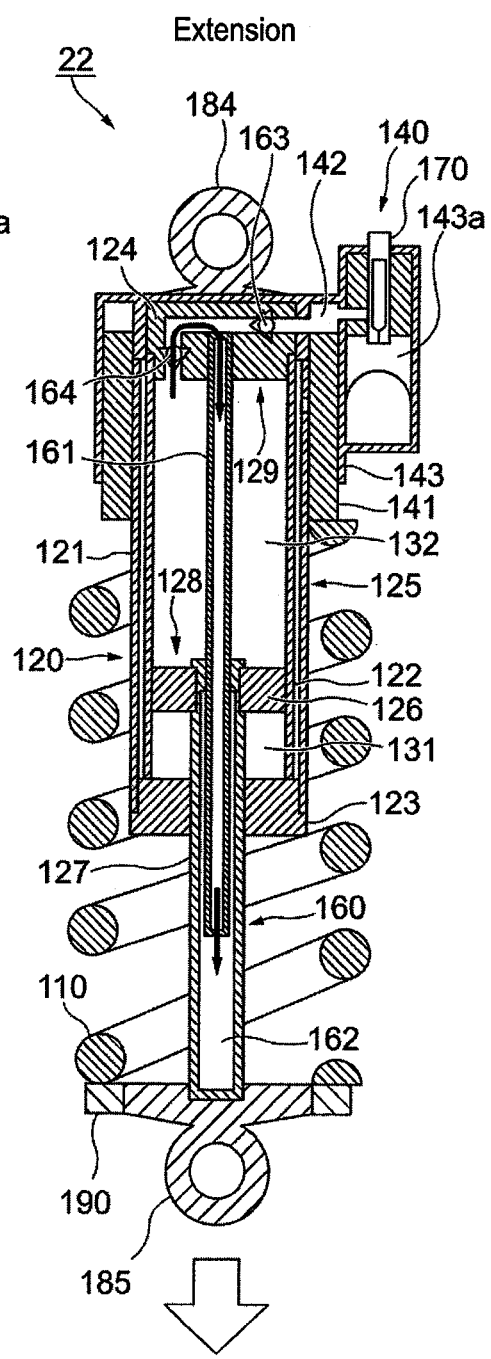
FIG. 3A Compression
FIG. 3B Extension

FIG. 4A
FIG. 4B
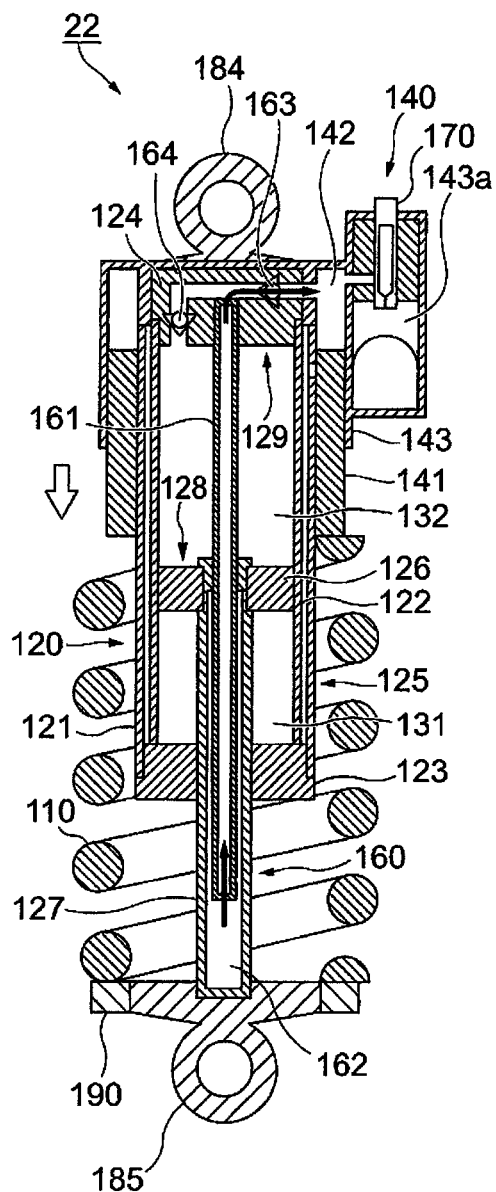
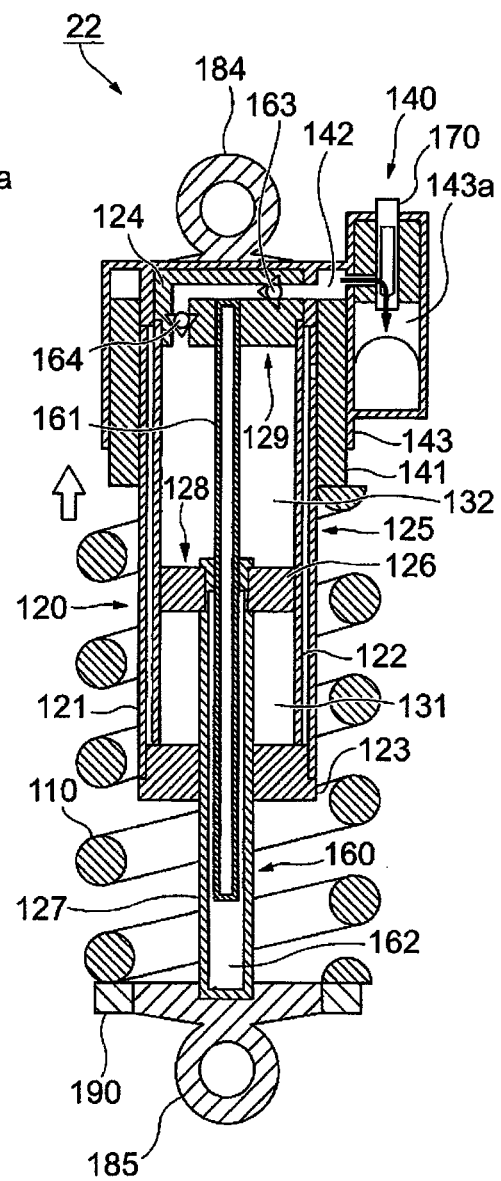

Compression

Extension

FIG. 19A

| Vehicle height adjusting switch | Front wheel side target current |
|---|---|
| Low | Zero |
| Medium | A1/2 |
| High | A1 |

FIG. 19B

| Vehicle height adjusting switch | Rear wheel side target current |
|---|---|
| Low | Zero |
| Medium | A2/2 |
| High | A2 |

VEHICLE HEIGHT ADJUSTING DEVICE AND VEHICLE HEIGHT ADJUSTING METHOD

CROSS-REFERENCE TO RELATED APPLICATIONS

This application is based on and claims priority under 35 U.S.C. 119 from Japanese Patent Application No. 2013-194564 filed on Sep. 19, 2013, the entire content of which is incorporated herein by reference.

BACKGROUND

1. Technical Field

The present invention relates to a vehicle height adjusting device and a vehicle height adjusting method for adjusting a vehicle height of a motorcycle.

2. Related Art

In recent years, devices are being proposed for increasing a vehicle height of a motorcycle when it travels and reducing a vehicle height of the same when it is stopped in order to allow a rider to mount and dismount the motorcycle more easily.

There is, for example, as described in Patent Literature 1, a vehicle height adjusting device which automatically changes a vehicle height in response to a vehicle speed of a motorcycle, wherein the vehicle height is automatically increased when the vehicle speed reaches a set speed and automatically reduced when the vehicle speed equals or falls below the set speed. In addition, an electromagnetic actuator is actuated in order to adjust vehicle height.

CITATION LIST

Patent Literature

Patent Literature 1: JP-B-H08-22680

SUMMARY OF INVENTION

Related-art vehicle height adjusting devices which automatically change vehicle heights in response to the vehicle speed of a motorcycle are only capable of switching between two states, namely, a state where the vehicle height is low and a state where the vehicle height is high. In these devices, power must be continuously supplied to the electromagnetic actuator to maintain either a low vehicle height state or a high vehicle height state. This made it more difficult to achieve power saving with these devices.

An object of the present invention is to provide a vehicle height adjusting device and a vehicle height adjusting method capable of achieving power saving.

In order to achieve the object described above, an illustrative aspect of the present invention provides a vehicle height adjusting device including a changing unit that changes relative positions of a vehicle main body and wheels of a vehicle and a control unit that adjusts a vehicle height that is a height of the vehicle main body by controlling the changing unit to change the relative positions, wherein the changing unit includes an electromagnetic valve that is provided on a circulation path of a fluid and that is adjusted to have an opening amount in accordance with supplied power and changes the relative positions as pressure of the fluid varies in accordance with the opening amount of the electromagnetic valve, and the control unit performs Pulse-Width-Modulation control on voltage applied to the electromagnetic valve so that the opening amount of the electromagnetic valve equals a desired opening amount.

In this case, the control unit may control the opening amount of the electromagnetic valve by changing a duty ratio of the voltage applied to the electromagnetic valve in response to a request made by a rider via an operating unit provided in the vehicle.

In addition, the control unit may control the opening amount of the electromagnetic valve by changing a duty ratio of the voltage applied to the electromagnetic valve in accordance with a load acting on the wheels from the vehicle main body.

Furthermore, the control unit may control the opening amount of the electromagnetic valve by changing a duty ratio of the voltage applied to the electromagnetic valve in accordance with a vehicle speed that is a travel speed of the vehicle.

In addition, when the control unit maintains the vehicle height in a highest state, the control unit may maintain the duty ratio of the voltage applied to the electromagnetic valve at a value that is less than 100%.

Furthermore, another aspect of the present invention provides a vehicle height adjusting method of adjusting a vehicle height that is a height of a vehicle main body of a vehicle by controlling a changing unit including an electromagnetic valve that is provided on a circulation path of a fluid and that is adjusted to have an opening amount in accordance with supplied power, and changing relative positions of the vehicle main body and wheels of the vehicle as pressure of the fluid varies in accordance with the opening amount of the electromagnetic valve, the method including performing Pulse-Width-Modulation control on voltage applied to the electromagnetic valve so that the opening amount of the electromagnetic valve equals a desired opening amount.

In this case, when the vehicle height is maintained in a highest state, the duty ratio of the voltage applied to the electromagnetic valve may be maintained at a value that is less than 100%.

According to any one of the aspects of the present invention, a vehicle height adjusting device and a vehicle height adjusting method capable of achieving power saving can be provided.

BRIEF DESCRIPTION OF DRAWINGS

FIGS. 3A and 3B are diagrams for explaining an action of a rear wheel side liquid supplying device;

FIGS. 4A and 4B are diagrams for explaining vehicle height adjustment by a rear wheel side relative position changing device;

FIG. 19A is a diagram showing a correspondence between an operating position of a vehicle height adjusting switch and a front wheel side target current, and FIG. 19B is a diagram showing a correspondence between an operating position of the vehicle height adjusting switch and a rear wheel side target current;

DESCRIPTION OF EMBODIMENTS

Hereinafter, embodiments of the present invention will be described in detail with reference to the attached drawings.

First Embodiment

Figure 1:
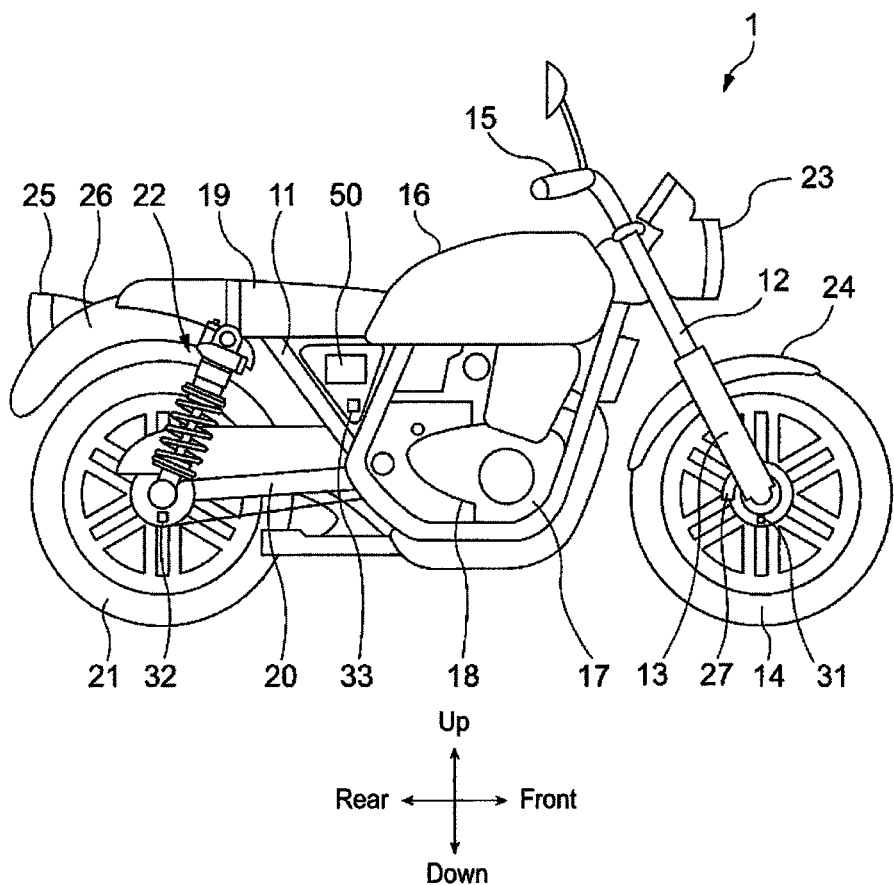
FIG. 1 is a diagram showing an overall configuration of a motorcycle according to a first embodiment.

FIG. 1 is a diagram showing an overall configuration of a motorcycle 1 according to a first embodiment.

As shown in FIG. 1, the motorcycle 1 includes a vehicle body frame 11, a head pipe 12 attached to a front end of the vehicle body frame 11, two front forks 13 provided on the head pipe 12, and a front wheel 14 attached to lower ends of the two front forks 13. One of the two front forks 13 is arranged on a left side of the front wheel 14, and the other front fork 13 is arranged on a right side of the front wheel 14. FIG. 1 only shows the front fork 13 arranged on the right side. A specific configuration of the front fork 13 will be described in detail later.

In addition, the motorcycle 1 includes a handle 15 attached to an upper part of the front fork 13, a fuel tank 16 attached to an upper front part of the vehicle body frame 11, and an engine 17 and a transmission 18 arranged below the fuel tank 16.

Furthermore, the motorcycle 1 includes a seat 19 attached to an upper rear part of the vehicle body frame 11, a swing arm 20 swingably attached to a lower part of the vehicle body frame 11, a rear wheel 21 attached to a rear end of the swing arm 20, and two rear suspensions 22 attached between a rear part of the swing arm 20 (the rear wheel 21) and a rear part of the vehicle body frame 11. One of the two rear suspensions 22 is arranged on a left side of the rear wheel 21, and the other rear suspension 22 is arranged on a right side of the rear wheel 21. FIG. 1 only shows the rear suspension 22 arranged on the right side. A specific configuration of the rear suspension 22 will be described in detail later.

In addition, the motorcycle 1 includes a headlamp 23 arranged in front of the head pipe 12, a front fender 24 attached to the front fork 13 so as to cover an upper part of the front wheel 14, a tail lamp 25 arranged behind the seat 19, and a rear fender 26 attached below the tail lamp 25 so as to cover an upper part of the rear wheel 21. Furthermore, the motorcycle 1 includes a brake 27 that stops rotation of the front wheel 14.

Furthermore, the motorcycle 1 includes a front wheel rotation detecting sensor 31 that detects a rotation angle of the front wheel 14 and a rear wheel rotation detecting sensor 32 that detects a rotation angle of the rear wheel 21. In addition, the motorcycle 1 includes a load detecting sensor 33 that detects a load generated on the front wheel 14 and the rear wheel 21 from the vehicle body frame 11 due to a rider mounting the seat 19, luggage being placed on the seat 19, or the like.

In addition, the motorcycle 1 includes a control device 50 as an example of control unit that controls a vehicle height of the motorcycle 1 by controlling opening/closing of a front wheel side electromagnetic valve 270 (to be described later) of the front fork 13 and a rear wheel side electromagnetic valve 170 (to be described later) of the rear suspension 22. Output signals from the front wheel rotation detecting sensor 31, the rear wheel rotation detecting sensor 32, the load detecting sensor 33, and the like described above are inputted to the control device 50.

Next, the rear suspension 22 will be described in detail.

Figure 2:
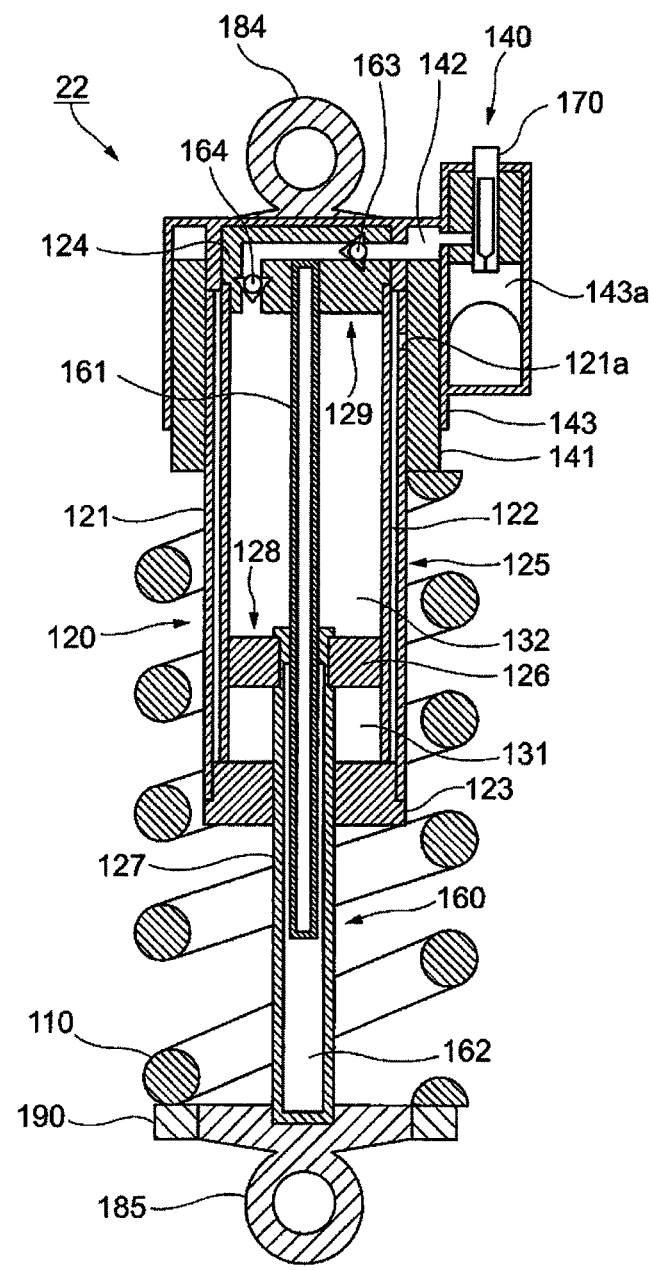
FIG. 2 is a sectional view of a rear suspension.

FIG. 2 is a sectional view of the rear suspension 22.

The rear suspension 22 is attached between the vehicle body frame 11 as an example of a vehicle main body of the motorcycle 1 and the rear wheel 21. In addition, the rear suspension 22 includes a rear wheel side suspending spring 110 that supports a vehicle weight of the motorcycle 1 and absorbs shock and a rear wheel side damper 120 that damps a vibration of the rear wheel side suspending spring 110. Furthermore, the rear suspension 22 includes a rear wheel side relative position changing device 140 capable of changing rear wheel side relative positions that are relative positions of the vehicle body frame 11 and the rear wheel 21 by adjusting a spring force of the rear wheel side suspending spring 110, and a rear wheel side liquid supplying device 160 that supplies a liquid to the rear wheel side relative position changing device 140. In addition, the rear suspension 22 includes a vehicle body side attaching member 184 for attaching the rear suspension 22 to the vehicle body frame 11, an axle side attaching member 185 for attaching the rear suspension 22 to the rear wheel 21, and a spring receiver 190 which is attached to the axle side attaching member 185 and which supports one end (in FIG. 2, a lower part) of the rear wheel side suspending spring 110 in a center line direction thereof. The rear suspension 22 functions as an example of changing unit that changes relative positions of the vehicle body frame 11 and the rear wheel 21.

As shown in FIG. 2, the rear wheel side damper 120 is constituted by a cylinder 125 including an outer cylinder 121 with a thin-walled cylindrical shape, an inner cylinder 122 which is housed inside the outer cylinder 121 and which has a thin-walled cylindrical shape, a bottom lid 123 which blocks one end (a lower part in FIG. 2) of the cylindrical outer cylinder 121 in a center line direction (an up-down direction in FIG. 2) of the cylinder of the outer cylinder 121, and an upper lid 124 which blocks the other end (an upper part in FIG. 2) of the inner cylinder 122 in the center line direction. Hereinafter, the center line direction of the cylinder of the outer cylinder 121 will simply be referred to as a "center line direction".

Furthermore, the rear wheel side damper 120 includes a piston 126 that is inserted into the inner cylinder 122 so as to be movable in the center line direction, and a piston rod 127 which extends in the center line direction and which supports the piston 126 at another end (an upper end in FIG. 2) in the center line direction. The piston 126 comes into contact with an inner circumferential surface of the inner cylinder 122 and divides a space that is filled with a liquid (in the present embodiment, oil) inside the cylinder 125 into a first oil chamber 131 on the side of one end in the center line direction with respect to the piston 126 and a second oil chamber 132 on the side of the other end in the center line direction with respect to the piston 126. The piston rod 127 is a cylindrical member and a pipe 161 (to be described later) is inserted into the piston rod 127.

In addition, the rear wheel side damper 120 includes a first damping force generating device 128 that is arranged on the other end side in the center line direction of the piston rod 127 and a second damping force generating device 129 that is arranged on the other end side in the center line direction of the inner cylinder 122. The first damping force generating device 128 and the second damping force generating device 129 damp extensional/compressional vibrations of the cylinder 125 and the piston rod 127 which are generated when the rear wheel side suspending spring 110 absorbs impact force from the road surface. The first damping force generating device 128 is arranged so as to function as a communication path between the first oil chamber 131 and the second oil chamber 132, and the second damping force generating device 129 is arranged so as to function as a communication path between the second oil chamber 132 and a jack chamber 142 (to be described later) of the rear wheel side relative position changing device 140.

The rear wheel side liquid supplying device 160 is a device which performs a pumping operation due to an extensional/compressional movement of the piston rod 127 with respect to the cylinder 125 and which supplies a liquid to the jack chamber 142 (to be described later) of the rear wheel side relative position changing device 140.

The rear wheel side liquid supplying device 160 includes a cylindrical pipe 161 that is fixed to the upper lid 124 of the rear wheel side damper 120 so as to extend in the center line direction. The pipe 161 is coaxially inserted into a pump chamber 162 that is an interior of the cylindrical piston rod 127.

In addition, the rear wheel side liquid supplying device 160 includes a discharge check valve 163 that causes a liquid in the pump chamber 162 which is pressurized by a movement of the piston rod 127 in a direction in which the piston rod 127 enters the cylinder 125 and the pipe 161 to be discharged to the side of the jack chamber 142 (to be described later) and a suction check valve 164 that causes the liquid inside the cylinder 125 to be sucked into the pump chamber 162 which is depressurized by a movement of the piston rod 127 in a direction in which the piston rod 127 exits the cylinder 125 and the pipe 161.

FIGS. 3A and 3B are diagrams for explaining an action of the rear wheel side liquid supplying device 160.

When the motorcycle 1 travels and the rear suspension 22 receives force due to irregularities on the road surface, the rear wheel side liquid supplying device 160 configured as described above performs a pumping operation due to an extensional/compressional movement in which the piston rod 127 enters/exits the cylinder 125 and the pipe 161. When the pump chamber 162 is pressurized by the pumping operation, the liquid inside the pump chamber 162 opens the discharge check valve 163 and is discharged to the side of the jack chamber 142 of the rear wheel side relative position changing device 140 (refer to FIG. 3A), and when the pump chamber 162 is depressurized, the liquid inside the second oil chamber 132 of the cylinder 125 opens the suction check valve 164 and is sucked into the pump chamber 162 (refer to FIG. 3B).

The rear wheel side relative position changing device 140 includes a supporting member 141 which is arranged so as to cover an outer circumference of the cylinder 125 of the rear wheel side damper 120 and which supports the other end (in FIG. 2, the upper part) in the center line direction of the rear wheel side suspending spring 110, and a hydraulic jack 143 which is arranged so as to cover an outer circumference of the other end side (in FIG. 2, the upper side) in the center line direction of the cylinder 125 and which forms the jack chamber 142 together with the supporting member 141. The supporting member 141 moves in the center line direction with respect to the hydraulic jack 143 as the jack chamber 142 is filled with the liquid inside the cylinder 125 or as liquid is discharged from the jack chamber 142. In addition, the vehicle body side attaching member 184 is attached to an upper part of the hydraulic jack 143. A movement of the supporting member 141 in the center line direction with respect to the hydraulic jack 143 causes a spring force of the rear wheel side suspending spring 110 to change and, consequently, a relative position of the seat 19 with respect to the rear wheel 21 changes.

Furthermore, the rear wheel side relative position changing device 140 includes a rear wheel side electromagnetic valve 170 that is an electromagnetic valve (a solenoid valve) which is provided on a fluid circulation path between the jack chamber 142 and a liquid reservoir chamber 143a formed in the hydraulic jack 143 and which is closed so as to store, in the jack chamber 142, the liquid supplied to the jack chamber 142 and opened so as to discharge the liquid supplied to the jack chamber 142 to the liquid reservoir chamber 143a formed in the hydraulic jack 143. The rear wheel side electromagnetic valve 170 will be described in detail later. Moreover, the liquid discharged to the liquid reservoir chamber 143a is returned into the cylinder 125.

FIGS. 4A and 4B are diagrams for explaining vehicle height adjustment by the rear wheel side relative position changing device 140.

When liquid is supplied into the jack chamber 142 by the rear wheel side liquid supplying device 160 in a state where the rear wheel side electromagnetic valve 170 is even slightly closed from a fully opened state, the inside of the jack chamber 142 is filled with liquid, the supporting member 141 moves toward the side of the one end (the lower side in FIG. 4A) in the center line direction with respect to the hydraulic jack 143, and a spring length of the rear wheel side suspending spring 110 is reduced (refer to FIG. 4A). On the other hand, when the rear wheel side electromagnetic valve 170 is fully opened, the liquid inside the jack chamber 142 is discharged to the liquid reservoir chamber 143a, the supporting member 141 moves toward the side of the other end (the upper side in FIG. 4B) in the center line direction with respect to the hydraulic jack 143, and the spring length of the rear wheel side suspending spring 110 is increased (refer to FIG. 4B).

When the spring length of the rear wheel side suspending spring 110 is reduced due to the movement of the supporting member 141 with respect to the hydraulic jack 143, a spring force at which the rear wheel side suspending spring 110 pushes the supporting member 141 increases as compared to before the movement of the supporting member 141 with respect to the hydraulic jack 143. As a result, an initial set load which prevents relative positions of the vehicle body frame 11 and the rear wheel 21 from changing is switched even if a force acts toward the side of the rear wheel 21 from the vehicle body frame 11. In this case, when a same force acts on the side of the one end (the lower side in FIGS. 4A and 4B) in the center line direction from the side of the vehicle body frame 11 (the seat 19), a depression amount of the rear suspension 22 (a variation in a distance between the vehicle body side attaching member 184 and the axle side attaching member 185) decreases. Therefore, when the spring length of the rear wheel side suspending spring 110 is reduced due to the movement of the supporting member 141 with respect to the hydraulic jack 143, a height of the seat 19 increases (the vehicle height increases) as compared to before the movement of the supporting member 141 with respect to the hydraulic jack 143. In other words, the vehicle height increases as the opening amount of the rear wheel side electromagnetic valve 170 decreases.

On the other hand, when the spring length of the rear wheel side suspending spring 110 is increased due to the movement of the supporting member 141 with respect to the hydraulic jack 143, the spring force at which the rear wheel side suspending spring 110 pushes the supporting member 141 decreases as compared to before the movement of the supporting member 141 with respect to the hydraulic jack 143. In this case, when a same force acts on the side of the one end (the lower side in FIGS. 4A and 4B) in the center line direction from the side of the vehicle body frame 11 (the seat 19), a depression amount of the rear suspension 22 (a variation in the distance between the vehicle body side attaching member 184 and the axle side attaching member 185) increases. Therefore, when the spring length of the rear wheel side suspending spring 110 is increased due to the movement of the supporting member 141 with respect to the hydraulic jack 143, a height of the seat 19 decreases (the vehicle height decreases) as compared to before the movement of the supporting member 141 with respect to the hydraulic jack 143. In other words, the vehicle height decreases as the opening amount of the rear wheel side electromagnetic valve 170 increases.

Moreover, the opening/closing of the rear wheel side electromagnetic valve 170 is controlled by the control device 50.

In addition, a destination to which the liquid supplied to the jack chamber 142 is discharged when the rear wheel side electromagnetic valve 170 opens may be the first oil chamber 131 and/or the second oil chamber 132 in the cylinder 125.

Furthermore, as shown in FIG. 2, a return path 121a through which the liquid inside the jack chamber 142 is returned into the cylinder 125 when the supporting member 141 moves to a limit position set in advance on the side of the one end (the lower side in FIG. 2) in the center line direction with respect to the hydraulic jack 143 is formed in the outer cylinder 121 of the cylinder 125.

Figure 5:
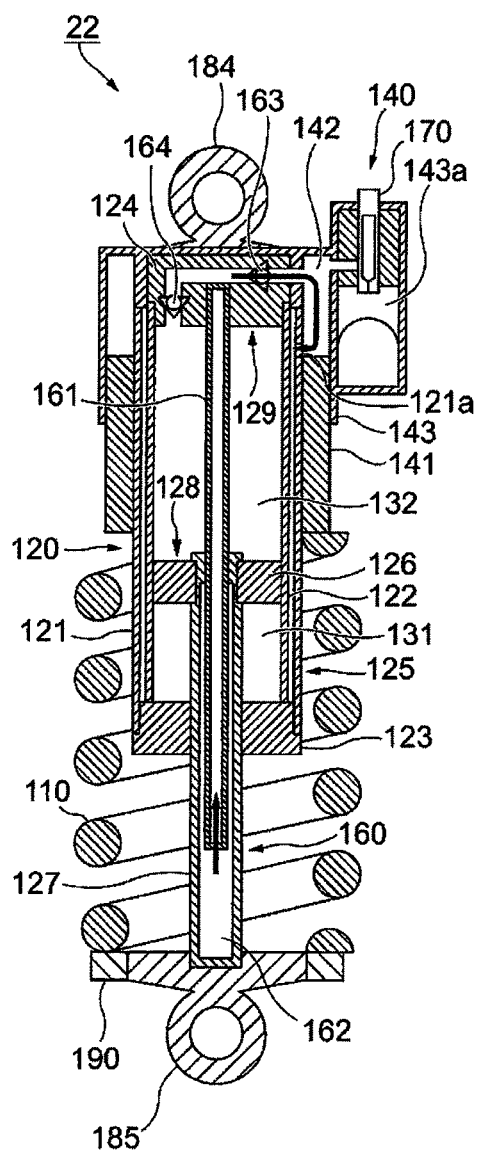
FIG. 5 is a diagram showing a mechanism by which a vehicle height is maintained.

FIG. 5 is a diagram showing a mechanism by which a vehicle height is maintained.

Due to the return path 121a, even if liquid is continuously supplied into the jack chamber 142 when the rear wheel side electromagnetic valve 170 is fully closed, since the supplied liquid is returned into the cylinder 125, a position of the supporting member 141 with respect to the hydraulic jack 143 and, by extension, the height of the seat 19 (the vehicle height) are maintained.

Moreover, hereinafter, a state of the rear suspension 22 when the rear wheel side electromagnetic valve 170 is fully opened and a travel amount of the supporting member 141 with respect to the hydraulic jack 143 is minimum (zero) will be referred to as a minimum state and a state of the rear suspension 22 when the rear wheel side electromagnetic valve 170 is fully closed and a travel amount of the supporting member 141 with respect to the hydraulic jack 143 is maximum will be referred to as a maximum state.

Figure 11:
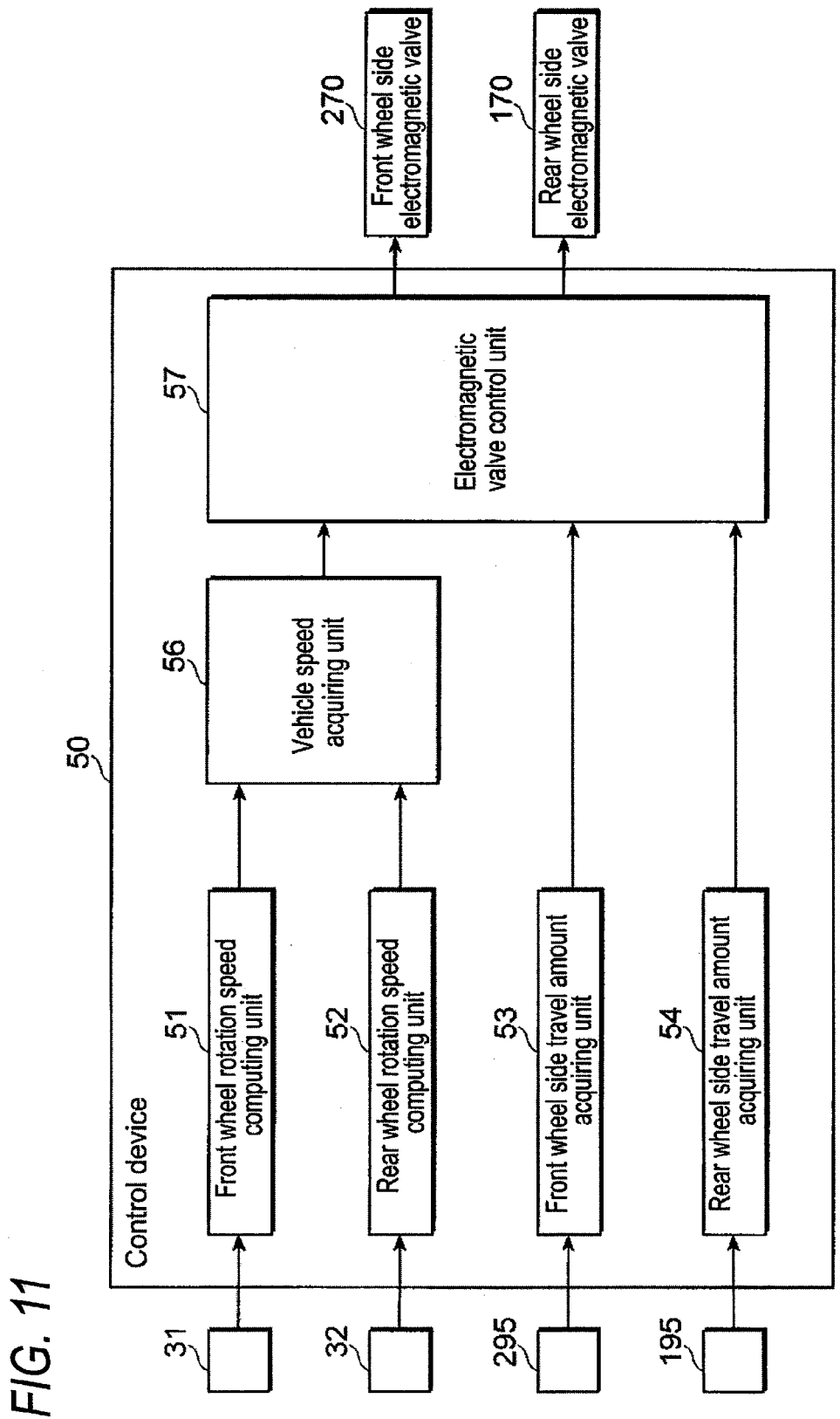
FIG. 11 is a block diagram of a control device.

In addition, the rear suspension 22 includes a rear wheel side relative position detecting unit 195 (refer to FIG. 11). As the rear wheel side relative position detecting unit 195, a configuration can be exemplified which detects a travel amount of the supporting member 141 with respect to the hydraulic jack 143 in the center line direction or, in other words, a travel amount of the supporting member 141 with respect to the vehicle body side attaching member 184 in the center line direction. Specifically, a configuration can be exemplified in which a coil is wound around an outer circumferential surface of the supporting member 141 and the hydraulic jack 143 is constituted by a magnetic body and which detects the travel amount of the supporting member 141 based on an impedance of the coil that varies in accordance with a movement of the supporting member 141 with respect to the hydraulic jack 143 in the center line direction.

Next, the front fork 13 will be described in detail.

Figure 6:
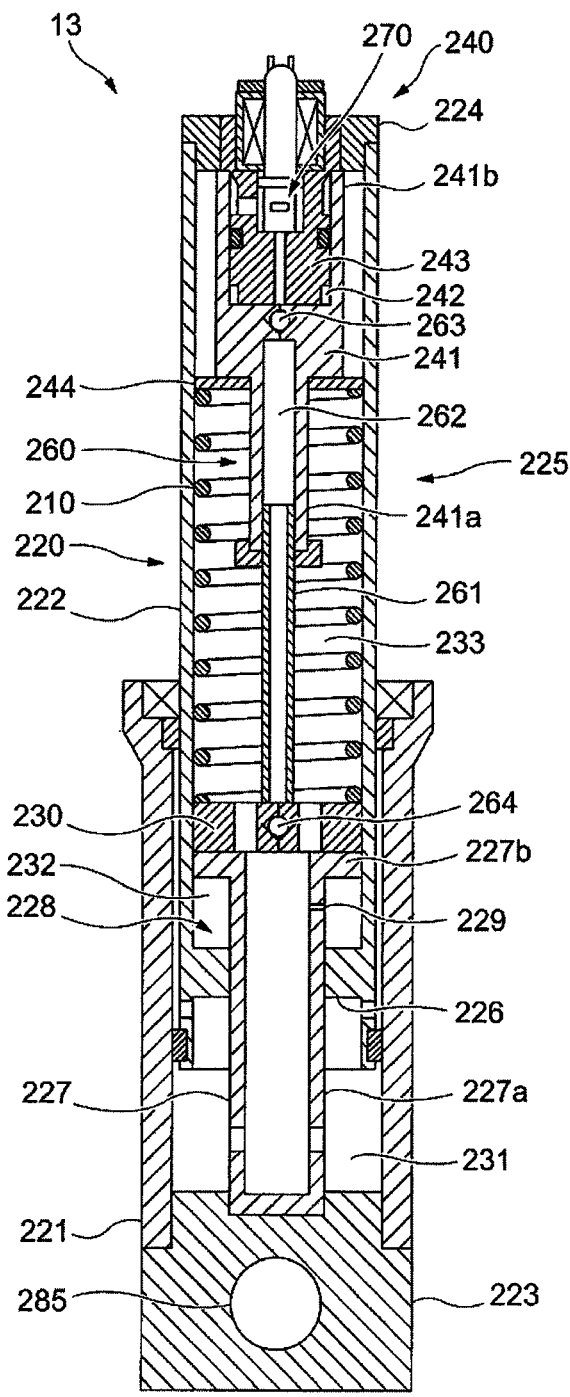
FIG. 6 is a sectional view of a front fork.

FIG. 6 is a sectional view of the front fork 13.

The front fork 13 is attached between the vehicle body frame 11 and the front wheel 14. In addition, the front fork 13 includes a front wheel side suspending spring 210 that supports a vehicle weight of the motorcycle 1 and absorbs shock and a front wheel side damper 220 that damps a vibration of the front wheel side suspending spring 210. Furthermore, the front fork 13 includes a front wheel side relative position changing device 240 capable of changing front wheel side relative positions that are relative positions of the vehicle body frame 11 and the front wheel 14 by adjusting a spring force of the front wheel side suspending spring 210, and a front wheel side liquid supplying device 260 that supplies a liquid to the front wheel side relative position changing device 240. Moreover, the front fork 13 includes an axle side attaching unit 285 for attaching the front fork 13 to the front wheel 14 and a head pipe side attaching unit (not shown) for attaching the front fork 13 to the head pipe 12. The front fork 13 functions as an example of changing unit that changes relative positions of the vehicle body frame 11 and the front wheel 14.

As shown in FIG. 6, the front wheel side damper 220 is constituted by a cylinder 225 including an outer cylinder 221 with a thin-walled cylindrical shape, an inner cylinder 222 which has a thin-walled cylindrical shape and which has one end inserted into the cylindrical outer cylinder 221 from another end (an upper part in FIG. 6) of the outer cylinder 221 in a center line direction thereof (an up-down direction in FIG. 6), a bottom lid 223 which blocks one end (a lower part in FIG. 6) of the outer cylinder 221 in the center line direction, and an upper lid 224 which blocks the other end (an upper part in FIG. 6) of the inner cylinder 222 in the center line direction. The inner cylinder 222 is slidably inserted into the outer cylinder 221.

In addition, the front wheel side damper 220 includes a piston rod 227 that is attached to the bottom lid 223 so as to extend in the center line direction. The piston rod 227 includes a cylindrical part 227a which extends in the center line direction and which is cylindrical and a disk-shaped flange part 227b that is provided at another end (an upper part in FIG. 6) of the cylindrical part 227a in the center line direction.

Furthermore, the front wheel side damper 220 includes a piston 226 which is fixed to a side of the one end (a lower side in FIG. 6) of the inner cylinder 222 in the center line direction and which is slidable with respect to an outer circumference of the cylindrical part 227a of the piston rod 227. The piston 226 comes into contact with an outer circumferential surface of the cylindrical part 227a of the piston rod 227 and divides a space that is filled with a liquid (in the present embodiment, oil) inside the cylinder 225 into a first oil chamber 231 on the side of one end in the center line direction with respect to the piston 226 and a second oil chamber 232 on the side of the other end in the center line direction with respect to the piston 226.

In addition, the front wheel side damper 220 includes a cover member 230 which is provided above the piston rod 227 and which covers an opening of the cylindrical part 227a of the piston rod 227. The cover member 230 supports one end (a lower end in FIG. 6) of the front wheel side suspending spring 210 in the center line direction. Furthermore, the front wheel side damper 220 includes an oil reservoir chamber 233 that is formed in a space on the side of the other end in the inner cylinder 222 in the center line direction with respect to the cover member 230 and in a space inside the cylindrical part 227a of the piston rod 227. The oil reservoir chamber 233 is constantly in communication with the first oil chamber 231 and the second oil chamber 232.

In addition, the front wheel side damper 220 includes a first damping force generating unit 228 that is provided on the piston 226 and a second damping force generating unit 229 that is formed on the piston rod 227. The first damping force generating unit 228 and the second damping force generating unit 229 damp extensional/compressional vibrations of the inner cylinder 222 and the piston rod 227 which are generated when the front wheel side suspending spring 210 absorbs impact force from the road surface. The first damping force generating unit 228 is arranged so as to function as a communication path between the first oil chamber 231 and the second oil chamber 232, and the second damping force generating unit 229 is arranged so as to function as a communication path among the first oil chamber 231, the second oil chamber 232, and the oil reservoir chamber 233.

The front wheel side liquid supplying device 260 is a device which performs a pumping operation due to an extensional/compressional movement of the piston rod 227 with respect to the inner cylinder 222 and which supplies a liquid to a jack chamber 242 (to be described later) of the front wheel side relative position changing device 240.

The front wheel side liquid supplying device 260 includes a cylindrical pipe 261 that is fixed to the cover member 230 of the front wheel side damper 220 so as to extend in the center line direction. The pipe 261 is coaxially inserted into a pump chamber 262 that constitutes an interior of a lower cylindrical part 241a of a supporting member 241 of the front wheel side relative position changing device 240 (to be described later).

In addition, the front wheel side liquid supplying device 260 includes a discharge check valve 263 that causes a liquid in the pump chamber 262 which is pressurized by a movement of the piston rod 227 in a direction in which the piston rod 227 enters the inner cylinder 222 to be discharged to the side of the jack chamber 242 (to be described later) and a suction check valve 264 that causes the liquid inside the oil reservoir chamber 233 to be sucked into the pump chamber 262 which is depressurized by a movement of the piston rod 227 in a direction in which the piston rod 227 exits the inner cylinder 222.

Figure 7A:
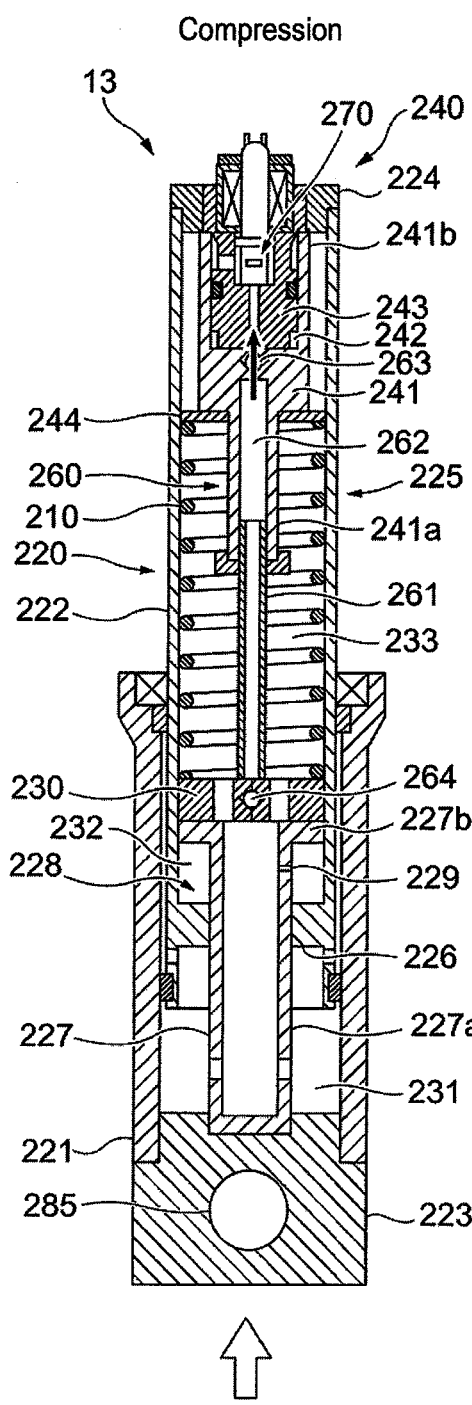
FIGS. 7A and 7B are diagrams for explaining an action of a front wheel side liquid supplying device.
Figure 7B:
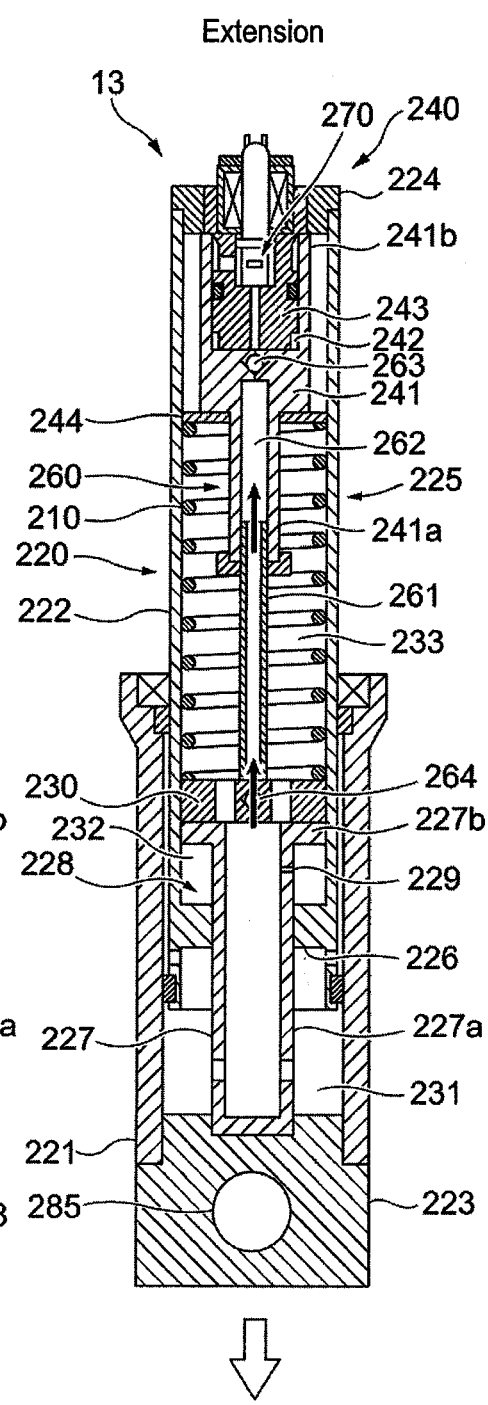

FIGS. 7A and 7B are diagrams for explaining an action of the front wheel side liquid supplying device 260.

When the motorcycle 1 travels and the front fork 13 receives force due to irregularities on the road surface and the piston rod 227 enters/exits the inner cylinder 222, the front wheel side liquid supplying device 260 configured as described above performs a pumping operation due to the pipe 261 entering/exiting the supporting member 241 of the front wheel side relative position changing device 240. When the pump chamber 262 is pressurized by the pumping operation, the liquid inside the pump chamber 262 opens the discharge check valve 263 and is discharged to the side of the jack chamber 242 of the front wheel side relative position changing device 240 (refer to FIG. 7A), and when the pump chamber 262 is depressurized, the liquid inside the oil reservoir chamber 233 opens the suction check valve 264 and is sucked into the pump chamber 262 (refer to FIG. 7B).

The front wheel side relative position changing device 240 includes the supporting member 241 which is arranged inside the inner cylinder 222 of the front wheel side damper 220 and which supports the other end (the upper part in FIG. 6) of the front wheel side suspending spring 210 in the center line direction via a disk-shaped spring receiver 244. The supporting member 241 includes the lower cylindrical part 241a that is formed in a cylindrical shape on the side of one end (a lower side in FIG. 6) in the center line direction and an upper cylindrical part 241b that is formed in a cylindrical shape on the side of the other end (an upper side in FIG. 6) in the center line direction. The pipe 261 is inserted into the lower cylindrical part 241a.

In addition, the front wheel side relative position changing device 240 includes a hydraulic jack 243 which is fitted into the upper cylindrical part 241b of the supporting member 241 and which forms the jack chamber 242 together with the supporting member 241. The supporting member 241 moves in the center line direction with respect to the hydraulic jack 243 as the jack chamber 242 is filled with the liquid inside the cylinder 225 or as liquid is discharged from the jack chamber 242. In addition, the head pipe side attaching unit (not shown) is attached to an upper part of the hydraulic jack 243. A movement of the supporting member 241 in the center line direction with respect to the hydraulic jack 243 causes a spring force of the front wheel side suspending spring 210 to change and, consequently, a relative position of the seat 19 with respect to the front wheel 14 changes.

Furthermore, the front wheel side relative position changing device 240 includes a front wheel side electromagnetic valve 270 that is an electromagnetic valve (a solenoid valve) which is provided on a fluid circulation path between the jack chamber 242 and the oil reservoir chamber 233 and which is closed so as to store, in the jack chamber 242, the liquid supplied to the jack chamber 242 and opened so as to discharge the liquid supplied to the jack chamber 242 to the oil reservoir chamber 233. The front wheel side electromagnetic valve 270 will be described in detail later.

Figure 8A:
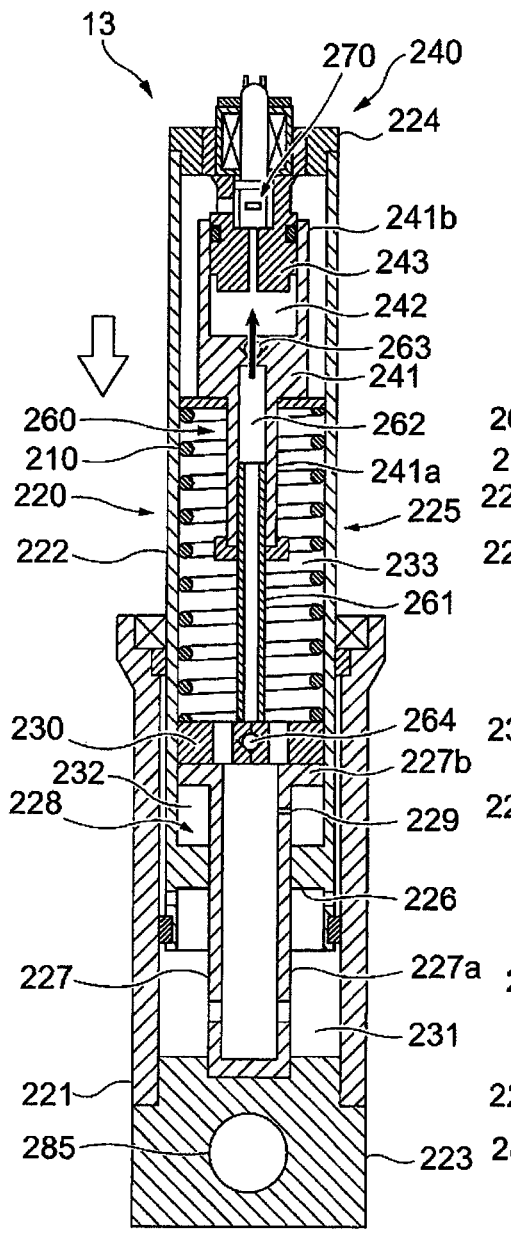
FIGS. 8A and 8B are diagrams for explaining vehicle height adjustment by a front wheel side relative position changing device.
Figure 8B:
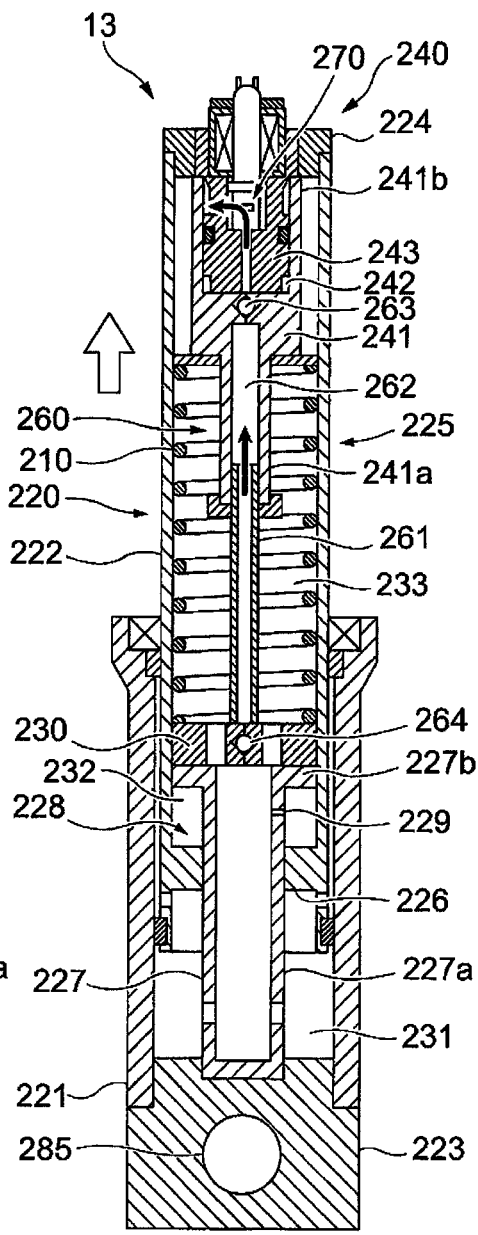

FIGS. 8A and 8B are diagrams for explaining vehicle height adjustment by the front wheel side relative position changing device 240.

When liquid is supplied into the jack chamber 242 by the front wheel side liquid supplying device 260 in a state where the front wheel side electromagnetic valve 270 is even slightly closed from a fully opened state, the inside of the jack chamber 242 is filled with liquid, the supporting member 241 moves toward the side of the one end (the lower side in FIG. 8A) in the center line direction with respect to the hydraulic jack 243, and a spring length of the front wheel side suspending spring 210 is reduced (refer to FIG. 8A). On the other hand, when the front wheel side electromagnetic valve 270 is fully opened, the liquid inside the jack chamber 242 is discharged to the oil reservoir chamber 233, the supporting member 241 moves toward the side of the other end (the upper side in FIG. 8B) in the center line direction with respect to the hydraulic jack 243, and the spring length of the front wheel side suspending spring 210 is increased (refer to FIG. 8B).

When the spring length of the front wheel side suspending spring 210 is reduced due to the movement of the supporting member 241 with respect to the hydraulic jack 243, a spring force at which the front wheel side suspending spring 210 pushes the supporting member 241 increases as compared to before the movement of the supporting member 241 with respect to the hydraulic jack 243. As a result, an initial set load which prevents relative positions of the vehicle body frame 11 and the front wheel 14 from changing is switched even if a force acts toward the side of the front wheel 14 from the vehicle body frame 11. In this case, when a same force acts on the side of the one end (the lower side in FIGS. 8A and 8B) in the center line direction from the side of the vehicle body frame 11 (the seat 19), a depression amount of the front fork 13 (a variation in a distance between the head pipe side attaching unit (not shown) and the axle side attaching unit 285) decreases. Therefore, when the spring length of the front wheel side suspending spring 210 is reduced due to the movement of the supporting member 241 with respect to the hydraulic jack 243, a height of the seat 19 increases (the vehicle height increases) as compared to before the movement of the supporting member 241 with respect to the hydraulic jack 243. In other words, the vehicle height increases as the opening amount of the front wheel side electromagnetic valve 270 decreases.

On the other hand, when the spring length of the front wheel side suspending spring 210 is increased due to the movement of the supporting member 241 with respect to the hydraulic jack 243, the spring force at which the front wheel side suspending spring 210 pushes the supporting member 241 decreases as compared to before the movement of the supporting member 241 with respect to the hydraulic jack 243. In this case, when a same force acts on the side of the one end (the lower side in FIGS. 8A and 8B) in the center line direction from the side of the vehicle body frame 11 (the seat 19), a depression amount of the front fork 13 (a variation in a distance between the head pipe side attaching unit (not shown) and the axle side attaching unit 285) increases. Therefore, when the spring length of the front wheel side suspending spring 210 is increased due to the movement of the supporting member 241 with respect to the hydraulic jack 243, a height of the seat 19 decreases (the vehicle height decreases) as compared to before the movement of the supporting member 241 with respect to the hydraulic jack 243. In other words, the vehicle height decreases as the opening amount of the front wheel side electromagnetic valve 270 increases.

Moreover, the opening/closing of the front wheel side electromagnetic valve 270 is controlled by the control device 50.

In addition, a destination to which the liquid supplied to the jack chamber 242 is discharged when the front wheel side electromagnetic valve 270 opens may be the first oil chamber 231 and/or the second oil chamber 232.

Figure 9:
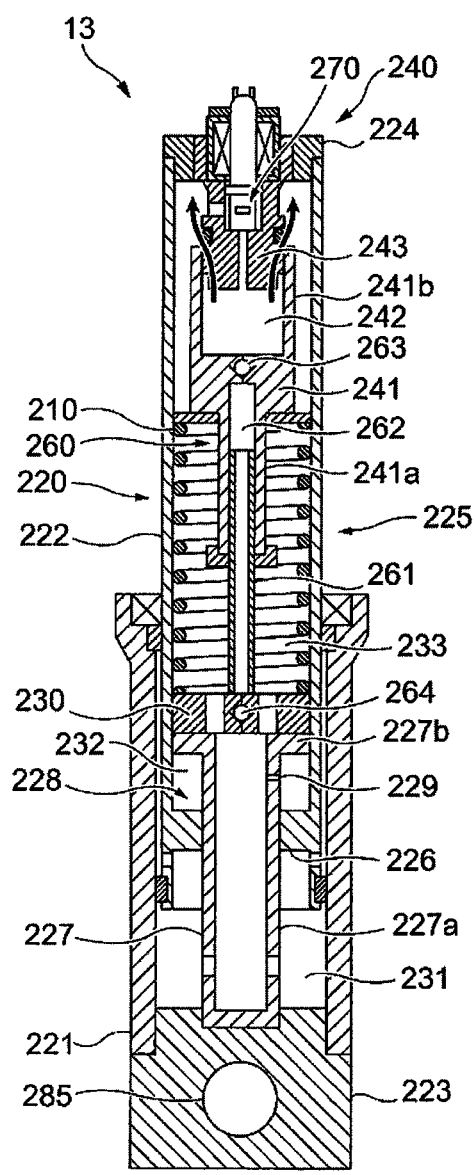
FIG. 9 is a diagram showing a mechanism by which a vehicle height is maintained.

FIG. 9 is a diagram showing a mechanism by which a vehicle height is maintained.

As shown in FIG. 9, a return path (not shown) through which the liquid inside the jack chamber 242 is returned into the oil reservoir chamber 233 when the supporting member 241 moves to a limit position set in advance on the side of the one end (the lower side in FIGS. 8A and 8B) in the center line direction with respect to the hydraulic jack 243 is formed on an outer circumferential surface of the hydraulic jack 243.

Due to the return path, even if liquid is continuously supplied into the jack chamber 242 when the front wheel side electromagnetic valve 270 is closed, since the supplied liquid is returned into the oil reservoir chamber 233, a position of the supporting member 241 with respect to the hydraulic jack 243 and, by extension, the height of the seat 19 (the vehicle height) are maintained.

Moreover, hereinafter, a state of the front fork 13 when the front wheel side electromagnetic valve 270 is fully opened and the travel amount of the supporting member 241 with respect to the hydraulic jack 243 is minimum (zero) will be referred to as a minimum state and a state of the front fork 13 when the front wheel side electromagnetic valve 270 is fully closed and the travel amount of the supporting member 241 with respect to the hydraulic jack 243 is maximum will be referred to as a maximum state.

In addition, the front fork 13 includes a front wheel side relative position detecting unit 295 (refer to FIG. 11). As the front wheel side relative position detecting unit 295, a configuration can be exemplified which detects the travel amount of the supporting member 241 with respect to the hydraulic jack 243 in the center line direction or, in other words, the travel amount of the supporting member 241 with respect to the head pipe side attaching unit in the center line direction. Specifically, a configuration can be exemplified in which a coil is wound at a position on an outer circumferential surface of the inner cylinder 222 in a radial direction and corresponding to the supporting member 241 in the center line direction, the supporting member 241 being constituted by a magnetic body, and which detects the travel amount of the supporting member 241 based on an impedance of the coil that varies in accordance with a movement of the supporting member 241 with respect to the hydraulic jack 243 in the center line direction.

Next, an overall configuration of the front wheel side electromagnetic valve 270 of the front wheel side relative position changing device 240 and the rear wheel side electromagnetic valve 170 of the rear wheel side relative position changing device 140 will be described.

Figure 10:
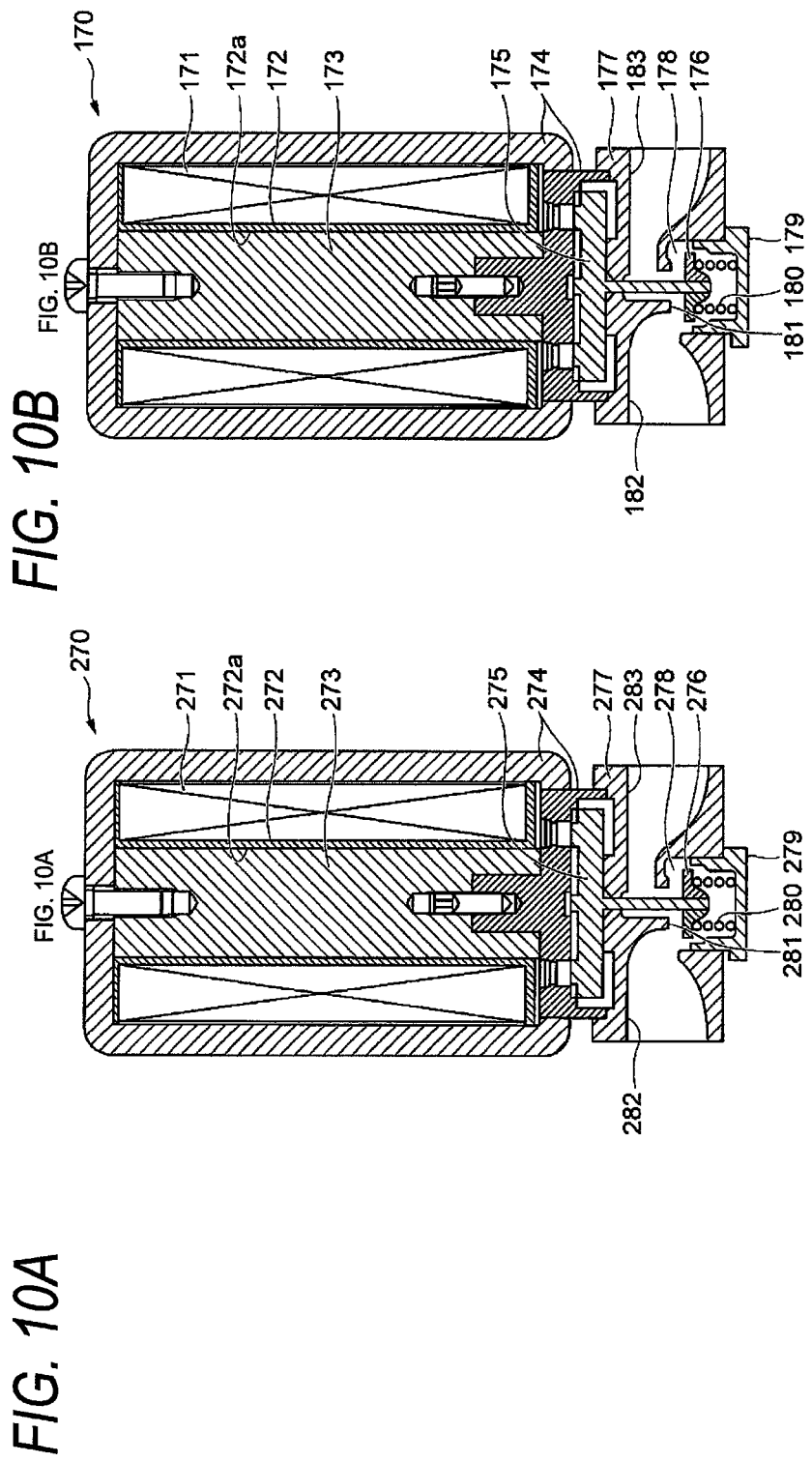
FIG. 10A is a diagram showing an overall configuration of a front wheel side electromagnetic valve.
FIG. 10B is a diagram showing an overall configuration of a rear wheel side electromagnetic valve.

FIG. 10A is a diagram showing an overall configuration of the front wheel side electromagnetic valve 270 and FIG. 10B is a diagram showing an overall configuration of the rear wheel side electromagnetic valve 170.

The front wheel side electromagnetic valve 270 is a so-called normally-open type electromagnetic valve. As shown in FIG. 10A, the front wheel side electromagnetic valve 270 includes a bobbin 272 around which a coil 271 is wound, a rod-like fixed iron core 273 that is fixed to a hollow part 272a of the bobbin 272, a holder 274 which supports the coil 271, the bobbin 272, and the fixed iron core 273, and an approximately disk-shaped movable iron core 275 which is arranged in correspondence with a tip (an end surface) of the fixed iron core 273 and which is attracted to the fixed iron core 273. In addition, the front wheel side electromagnetic valve 270 includes a valve body 276 fixed to a tip center of the movable iron core 275, a body 277 that is combined with the holder 274, a valve chamber 278 which is formed in the body 277 and in which the valve body 276 is arranged, a cover member 279 which covers an opening formed on the body 277 and which forms the valve chamber 278 in cooperation with the body 277, and a coil spring 280 arranged between the valve body 276 and the cover member 279. Furthermore, the front wheel side electromagnetic valve 270 includes a valve seat 281 which is formed on the body 277 and which is arranged in the valve chamber 278 in correspondence with the valve body 276, an inward guiding path 282 which is formed on the body 277 and which guides a fluid from the jack chamber 242 (refer to FIG. 9) into the valve chamber 278, and an outward guiding path 283 which is formed on the body 277 and which guides a fluid out from the valve chamber 278 toward the oil reservoir chamber 233 via the valve seat 281.

The rear wheel side electromagnetic valve 170 is a so-called normally-open type electromagnetic valve. As shown in FIG. 10B, the rear wheel side electromagnetic valve 170 includes a bobbin 172 around which a coil 171 is wound, a rod-like fixed iron core 173 that is fixed to a hollow part 172a of the bobbin 172, a holder 174 which supports the coil 171, the bobbin 172, and the fixed iron core 173, and an approximately disk-shaped movable iron core 175 which is arranged in correspondence with a tip (an end surface) of the fixed iron core 173 and which is attracted to the fixed iron core 173. In addition, the rear wheel side electromagnetic valve 170 includes a valve body 176 fixed to a tip center of the movable iron core 175, a body 177 that is combined with the holder 174, a valve chamber 178 which is formed in the body 177 and in which the valve body 176 is arranged, a cover member 179 which covers an opening formed on the body 177 and which forms the valve chamber 178 in cooperation with the body 177, and a coil spring 180 that is arranged between the valve body 176 and the cover member 179. Furthermore, the rear wheel side electromagnetic valve 170 includes a valve seat 181 which is formed on the body 177 and which is arranged in the valve chamber 178 in correspondence with the valve body 176, an inward guiding path 182 which is formed on the body 177 and which guides a fluid from the jack chamber 142 (refer to FIG. 5) into the valve chamber 178, and an outward guiding path 183 which is formed on the body 177 and which guides a fluid out from the valve chamber 178 toward the liquid reservoir chamber 143a via the valve seat 181.

With the front wheel side electromagnetic valve 270 and the rear wheel side electromagnetic valve 170 configured as described above, since the movable iron cores 275 and 175 are biased downward in the diagram by the coil springs 280 and 180 during non-energization in which the coils 271 and 171 are not energized, the valve bodies 276 and 176 that are fixed to the tips (end surfaces) of the movable iron cores 275 and 175 do not abut the valve seats 281 and 181. Therefore, communication is established between the inward guiding paths 282 and 182 and the outward guiding paths 283 and 183 and the front wheel side electromagnetic valve 270 and the rear wheel side electromagnetic valve 170 enter a valve-opened state. On the other hand, with the front wheel side electromagnetic valve 270 and the rear wheel side electromagnetic valve 170, during energization in which the coils 271 and 171 are energized, the movable iron cores 275 and 175 are displaced due to a balance between attractive forces of the fixed iron cores 273 and 173 that are generated as the coils 271 and 171 are excited due to energization and biasing forces of the coil springs 280 and 180. The front wheel side electromagnetic valve 270 and the rear wheel side electromagnetic valve 170 are configured so that positions of the valve bodies 276 and 176 with respect to the valve seats 281 and 181 or, in other words, opening amounts of the valves are adjustable. The opening amounts of the valves can be adjusted by varying power (current, voltage) that is supplied to the coils 271 and 171.

Next, the control device 50 will be described.

FIG. 11 is a block diagram of the control device 50.

The control device 50 includes a CPU, a ROM which stores programs executed by the CPU, various data, and the like, and a RAM which is used as a working memory of the CPU and the like. Output signals from the front wheel rotation detecting sensor 31, the rear wheel rotation detecting sensor 32, the front wheel side relative position detecting unit 295, the rear wheel side relative position detecting unit 195, and the like described above are inputted to the control device 50.

The control device 50 includes a front wheel rotation speed computing unit 51 that computes a rotation speed of the front wheel 14 based on an output signal from the front wheel rotation detecting sensor 31 and a rear wheel rotation speed computing unit 52 that computes a rotation speed of the rear wheel 21 based on an output signal from the rear wheel rotation detecting sensor 32. The front wheel rotation speed computing unit 51 and the rear wheel rotation speed computing unit 52 respectively acquire a rotation angle based on a pulse signal that is an output signal of the sensors and compute a rotation speed by differentiating the rotation angle with respect to elapsed time.

The control device 50 includes a front wheel side travel amount acquiring unit 53 which acquires, based on an output signal from the front wheel side relative position detecting unit 295, a front wheel side travel amount Lf that is a travel amount of the supporting member 241 of the front wheel side relative position changing device 240 (refer to FIGS. 8A and 8B) with respect to the hydraulic jack 243. In addition, the control device 50 includes a rear wheel side travel amount acquiring unit 54 which acquires, based on an output signal from the rear wheel side relative position detecting unit 195, a rear wheel side travel amount Lr that is a travel amount of the supporting member 141 of the rear wheel side relative position changing device 140 with respect to the hydraulic jack 143. The front wheel side travel amount acquiring unit 53 and the rear wheel side travel amount acquiring unit 54 respectively acquire the front wheel side travel amount Lf and the rear wheel side travel amount Lr based on a correlation between a coil impedance and the front wheel side travel amount Lf or the rear wheel side travel amount Lr which is stored in advance in the ROM.

Furthermore, the control device 50 includes a vehicle speed acquiring unit 56 which acquires a vehicle speed Vc that is a travel speed of the motorcycle 1 based on the rotation speed of the front wheel 14 computed by the front wheel rotation speed computing unit 51 and/or the rotation speed of the rear wheel 21 computed by the rear wheel rotation speed computing unit 52. The vehicle speed acquiring unit 56 acquires the vehicle speed Vc by computing the travel speed of the front wheel 14 or the rear wheel 21 using a front wheel rotation speed Rf or a rear wheel rotation speed Rr. The travel speed of the front wheel 14 can be computed using the front wheel rotation speed Rf and an outer diameter of a tire of the front wheel 14 and the travel speed of the rear wheel 21 can be computed using the rear wheel rotation speed Rr and an outer diameter of a tire of the rear wheel 21. When the motorcycle 1 is traveling in a normal state, the vehicle speed Vc can be understood to be equivalent to the travel speed of the front wheel 14 and/or the travel speed of the rear wheel 21. Alternatively, the vehicle speed acquiring unit 56 may acquire the vehicle speed Vc by computing an average travel speed of the front wheel 14 and the rear wheel 21 using an average value of the front wheel rotation speed Rf and the rear wheel rotation speed Rr.

In addition, the control device 50 includes an electromagnetic valve control unit 57 that controls opening/closing of the front wheel side electromagnetic valve 270 of the front wheel side relative position changing device 240 and the opening/closing of the rear wheel side electromagnetic valve 170 of the rear wheel side relative position changing device 140 based on the vehicle speed Vc acquired by the vehicle speed acquiring unit 56. The electromagnetic valve control unit 57 will be described in detail later.

The front wheel rotation speed computing unit 51, the rear wheel rotation speed computing unit 52, the front wheel side travel amount acquiring unit 53, the rear wheel side travel amount acquiring unit 54, the vehicle speed acquiring unit 56, and the electromagnetic valve control unit 57 are realized as the CPU executes software stored in a storage area of the ROM or the like.

Next, the electromagnetic valve control unit 57 of the control device 50 will be described in detail.

Figure 12:
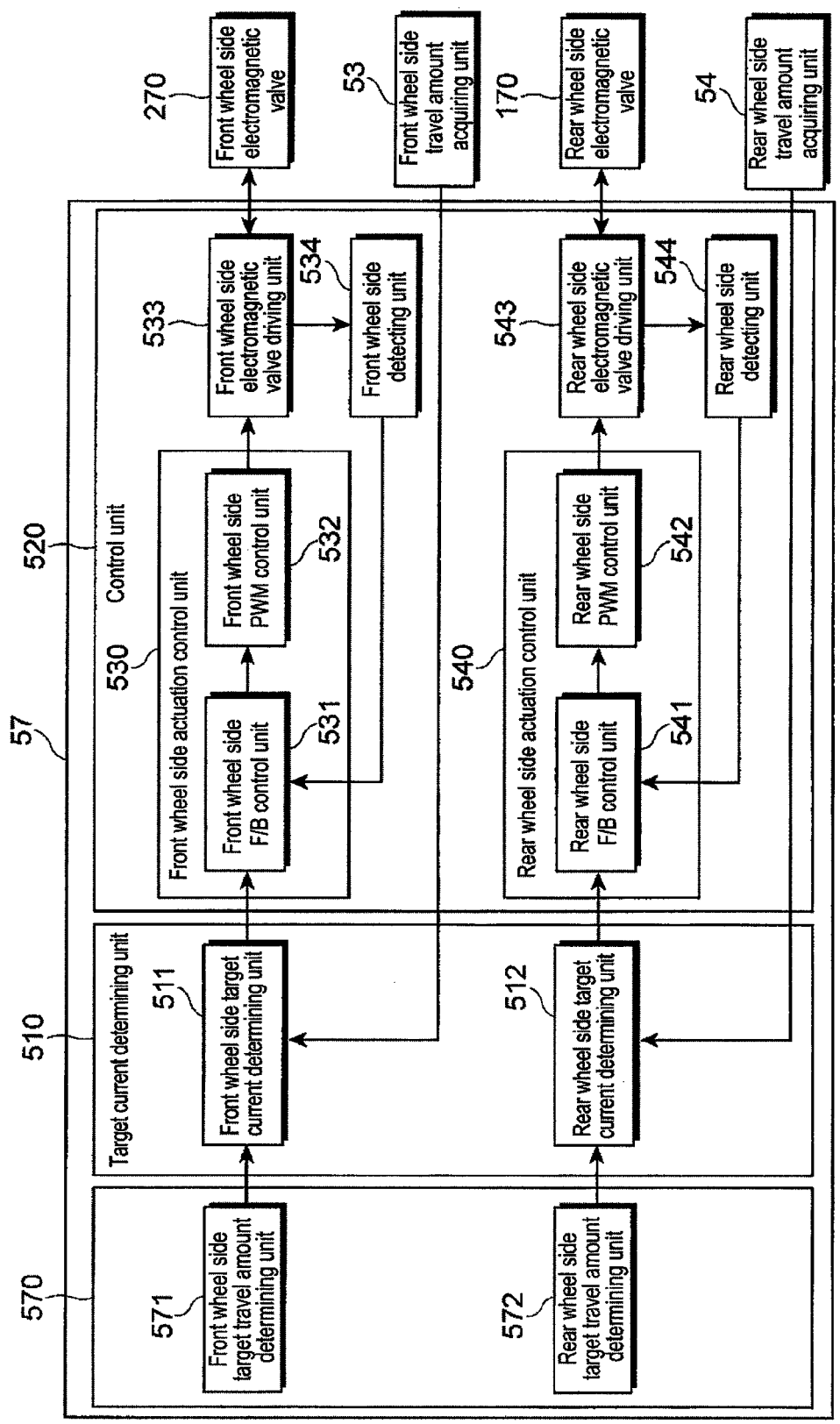
FIG. 12 is a block diagram of an electromagnetic valve control unit according to the first embodiment.

FIG. 12 is a block diagram of the electromagnetic valve control unit 57 according to the first embodiment.

The electromagnetic valve control unit 57 has a target travel amount determining unit 570 that includes a front wheel side target travel amount determining unit 571 which determines a front wheel side target travel amount that is a target travel amount of the front wheel side travel amount Lf and a rear wheel side target travel amount determining unit 572 which determines a rear wheel side target travel amount that is a target travel amount of the rear wheel side travel amount Lr. In addition, the electromagnetic valve control unit 57 includes a target current determining unit 510 that determines a target current to be supplied to the front wheel side electromagnetic valve 270 of the front wheel side relative position changing device 240 and the rear wheel side electromagnetic valve 170 of the rear wheel side relative position changing device 140 and a control unit 520 that performs feedback control and the like based on the target current determined by the target current determining unit 510.

The target travel amount determining unit 570 determines a target travel amount based on the vehicle speed Vc acquired by the vehicle speed acquiring unit 56 and on which position a vehicle height adjusting switch 34 (to be described later) which is provided on the motorcycle 1 and which is an example of operating unit is operated to.

Figure 13:
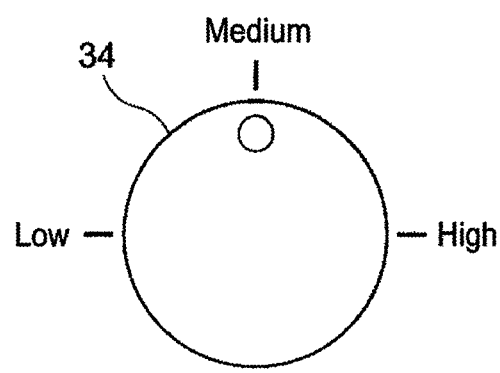
FIG. 13 is an external view of a vehicle height adjusting switch.

FIG. 13 is an external view of the vehicle height adjusting switch 34.

As shown in FIG. 13, the vehicle height adjusting switch 34 is a so-called dial-type switch and is configured so that a user can select "low", "medium", and "high" by rotating a knob. In addition, the vehicle height adjusting switch 34 is provided in a vicinity of, for example, a speedometer.

Figure 14A:
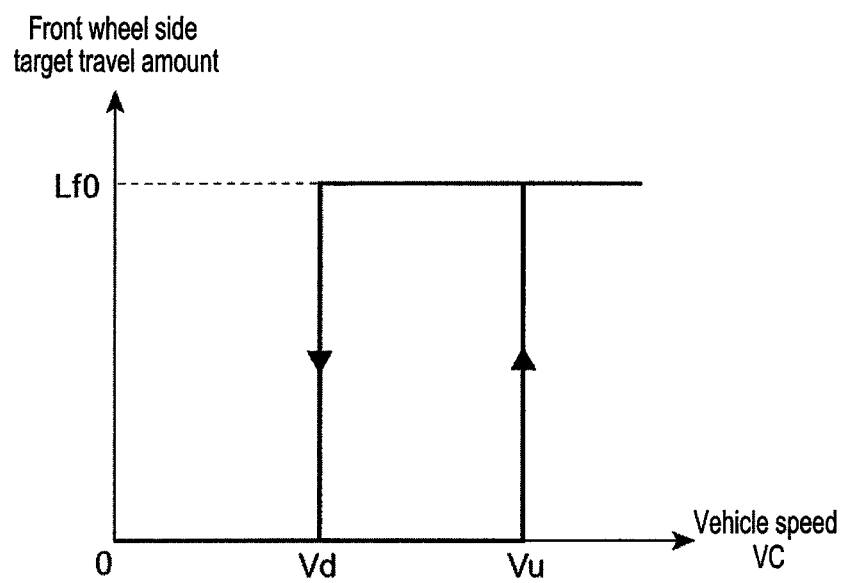
FIG. 14A is a diagram showing a correlation between a vehicle speed and a front wheel side target travel amount.
Figure 14B:
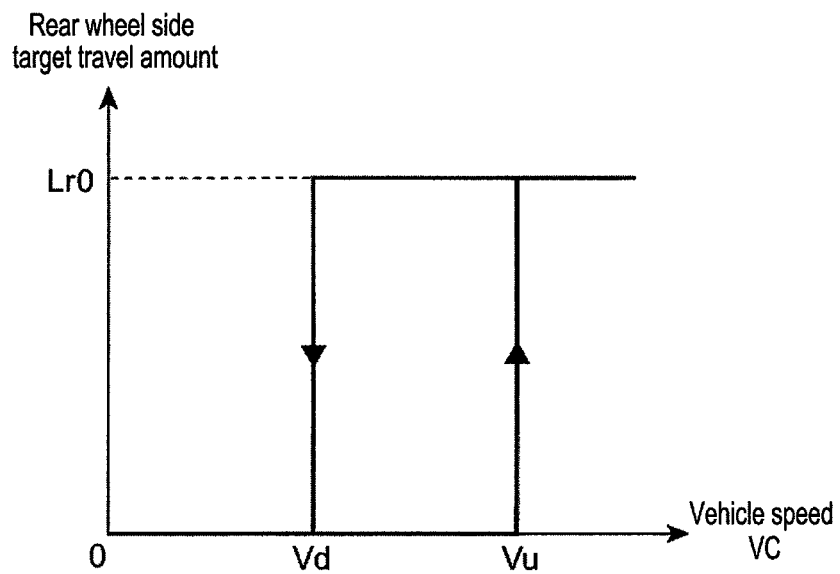
FIG. 14B is a diagram showing a correlation between the vehicle speed and a rear wheel side target travel amount.

FIG. 14A is a diagram showing a correlation between the vehicle speed Vc and a front wheel side target travel amount. FIG. 14B is a diagram showing a correlation between the vehicle speed Vc and a rear wheel side target travel amount.

After the motorcycle 1 starts traveling, the target travel amount determining unit 570 determines the target travel amount to be zero when the vehicle speed Vc acquired by the vehicle speed acquiring unit 56 is lower than a rising vehicle speed Vu determined in advance and determines the target travel amount to be a value determined in advance in accordance with an operating position of the vehicle height adjusting switch 34 when the vehicle speed Vc equals or exceeds the rising vehicle speed Vu from a state where the vehicle speed Vc is lower than the rising vehicle speed Vu. More specifically, as shown in FIG. 14A, the front wheel side target travel amount determining unit 571 determines the front wheel side target travel amount to be a prescribed front wheel side target travel amount Lf0 that is determined in advance in accordance with an operating position of the vehicle height adjusting switch 34 when the vehicle speed Vc equals or exceeds the rising vehicle speed Vu from a state where the vehicle speed Vc is lower than the rising vehicle speed Vu. On the other hand, as shown in FIG. 14B, the rear wheel side target travel amount determining unit 572 determines the rear wheel side target travel amount to be a prescribed rear wheel side target travel amount Lr0 that is determined in advance in accordance with an operating position of the vehicle height adjusting switch 34 when the vehicle speed Vc equals or exceeds the rising vehicle speed Vu from a state where the vehicle speed Vc is lower than the rising vehicle speed Vu. Hereinafter, when the vehicle speed Vc acquired by the vehicle speed acquiring unit 56 is equal to or higher than the rising vehicle speed Vu, the front wheel side target travel amount determining unit 571 and the rear wheel side target travel amount determining unit 572 determines the front wheel side target travel amount and the rear wheel side target travel amount to be the prescribed front wheel side target travel amount Lf0 and the prescribed rear wheel side target travel amount Lr0. A relationship between an operating position of the vehicle height adjusting switch 34 and the prescribed front wheel side target travel amount Lf0 and the prescribed rear wheel side target travel amount Lr0 corresponding to the operating position is stored in advance in the ROM. Since the vehicle height of the motorcycle 1 is determined in accordance with the front wheel side travel amount Lf and the rear wheel side travel amount Lr, a configuration can be exemplified in which a target vehicle height that is a target value of the vehicle height of the motorcycle 1 is determined in accordance with an operating position of the vehicle height adjusting switch 34, and the prescribed front wheel side target travel amount Lf0 and the prescribed rear wheel side target travel amount Lr0 corresponding to the target vehicle height are determined in advance and stored in the ROM.

On the other hand, the target travel amount determining unit 570 determines the target travel amount to be zero when a transition is made from a state where the motorcycle 1 travels at or above the rising vehicle speed Vu to a state where the motorcycle 1 travels at or below a falling vehicle speed Vd that is determined in advance. In other words, the front wheel side target travel amount determining unit 571 and the rear wheel side target travel amount determining unit 572 determine the front wheel side target travel amount and the rear wheel side target travel amount to be zero. Moreover, a rising vehicle speed Vu of 10 km/h and a falling vehicle speed Vd of 8 km/h can be exemplified.

In addition, even when the vehicle speed Vc acquired by the vehicle speed acquiring unit 56 is higher than the falling vehicle speed Vd, the target travel amount determining unit 570 determines the target travel amount to be zero when the motorcycle 1 suddenly decelerates due to emergency braking or the like. In other words, the front wheel side target travel amount determining unit 571 and the rear wheel side target travel amount determining unit 572 determine the front wheel side target travel amount and the rear wheel side target travel amount to be zero. Whether or not the motorcycle 1 has suddenly decelerated can be acquired based on whether or not an amount of decrease per unit time of the vehicle speed Vc acquired by the vehicle speed acquiring unit 56 is equal to or lower than a predetermined value.

The target current determining unit 510 includes a front wheel side target current determining unit 511 which determines a front wheel side target current that is a target current of the front wheel side electromagnetic valve 270 based on the front wheel side target travel amount determined by the front wheel side target travel amount determining unit 571 and a rear wheel side target current determining unit 512 which determines a rear wheel side target current that is a target current of the rear wheel side electromagnetic valve 170 based on the rear wheel side target travel amount determined by the rear wheel side target travel amount determining unit 572.

The front wheel side target current determining unit 511 determines a front wheel side target current by, for example, substituting the front wheel side target travel amount determined by the front wheel side target travel amount determining unit 571 into a map which is empirically created in advance and stored in the ROM and which shows a correspondence between a front wheel side target travel amount and a front wheel side target current.

The rear wheel side target current determining unit 512 determines a rear wheel side target current by, for example, substituting the rear wheel side target travel amount determined by the rear wheel side target travel amount determining unit 572 into a map which is empirically created in advance and stored in the ROM and which shows a correspondence between a rear wheel side target travel amount and a rear wheel side target current.

Moreover, when the front wheel side target travel amount and the rear wheel side target travel amount are zero, the front wheel side target current determining unit 511 and the rear wheel side target current determining unit 512 determine the front wheel side target current and the rear wheel side target current to be zero. In addition, when a transition is made from a state where the front wheel side target travel amount and the rear wheel side target travel amount have been determined to be zero and the front wheel side target current and the rear wheel side target current have been determined to be zero to a state where the front wheel side target travel amount and the rear wheel side target travel amount determined by the front wheel side target travel amount determining unit 571 and the rear wheel side target travel amount determining unit 572 assume values other than zero or, in other words, when an increase of the vehicle height is started from a state where the vehicle height has not been increased, the front wheel side target current determining unit 511 and the rear wheel side target current determining unit 512 determine the front wheel side target current and the rear wheel side target current to be a maximum current determined in advance for a certain amount of time. Furthermore, after the certain amount of time has elapsed, the front wheel side target current determining unit 511 and the rear wheel side target current determining unit 512 determine a front wheel side target current and a rear wheel side target current in accordance with the front wheel side target travel amount and the rear wheel side target travel amount determined by the front wheel side target travel amount determining unit 571 and the rear wheel side target travel amount determining unit 572.

Alternatively, when determining a front wheel side target current based on the front wheel side target travel amount determined by the front wheel side target travel amount determining unit 571, the front wheel side target current determining unit 511 may determine the front wheel side target current after the certain amount of time has elapsed by performing feedback control based on a deviation between the front wheel side target travel amount determined by the front wheel side target travel amount determining unit 571 and an actual front wheel side travel amount Lf acquired by the front wheel side travel amount acquiring unit 53. In a similar manner, when determining a rear wheel side target current based on the rear wheel side target travel amount determined by the rear wheel side target travel amount determining unit 572, the rear wheel side target current determining unit 512 may determine the rear wheel side target current after the certain amount of time has elapsed by performing feedback control based on a deviation between the rear wheel side target travel amount determined by the rear wheel side target travel amount determining unit 572 and an actual rear wheel side travel amount Lr acquired by the rear wheel side travel amount acquiring unit 54.

The control unit 520 includes a front wheel side actuation control unit 530 that controls actuation of the front wheel side electromagnetic valve 270, a front wheel side electromagnetic valve driving unit 533 that drives the front wheel side electromagnetic valve 270, and a front wheel side detecting unit 534 which detects an actual current that actually flows through the front wheel side electromagnetic valve 270. In addition, the control unit 520 includes a rear wheel side actuation control unit 540 that controls actuation of the rear wheel side electromagnetic valve 170, a rear wheel side electromagnetic valve driving unit 543 that drives the rear wheel side electromagnetic valve 170, and a rear wheel side detecting unit 544 which detects an actual current that actually flows through the rear wheel side electromagnetic valve 170.

The front wheel side actuation control unit 530 includes a front wheel side feedback (F/B) control unit 531 that performs feedback control based on a deviation between the front wheel side target current determined by the front wheel side target current determining unit 511 and an actual current (a front wheel side actual current) detected by the front wheel side detecting unit 534, and a front wheel side PWM control unit 532 that performs PWM control (Pulse-Width-Modulation control) on the front wheel side electromagnetic valve 270.

The rear wheel side actuation control unit 540 includes a rear wheel side feedback (F/B) control unit 541 that performs feedback control based on a deviation between the rear wheel side target current determined by the rear wheel side target current determining unit 512 and an actual current (a rear wheel side actual current) detected by the rear wheel side detecting unit 544, and a rear wheel side PWM control unit 542 that performs PWM control (Pulse-Width-Modulation control) on the rear wheel side electromagnetic valve 170.

The front wheel side feedback control unit 531 obtains a deviation between the front wheel side target current and the front wheel side actual current detected by the front wheel side detecting unit 534 and performs feedback control so that the deviation is reduced to zero. The rear wheel side feedback control unit 541 obtains a deviation between the rear wheel side target current and the rear wheel side actual current detected by the rear wheel side detecting unit 544 and performs feedback control so that the deviation is reduced to zero. As the front wheel side feedback control unit 531 and the rear wheel side feedback control unit 541, for example, a configuration can be exemplified in which a deviation between the front wheel side target current and the front wheel side actual current and a deviation between the rear wheel side target current and the rear wheel side actual current are subjected to a proportional process by a proportional element and an integral process by an integral element, and values thereof are added by an addition computing unit. Alternatively, as the front wheel side feedback control unit 531 and the rear wheel side feedback control unit 541, for example, a configuration can be exemplified in which deviations between target currents and actual currents are subjected to a proportional process by a proportional element, an integral process by an integral element, and a differential process by a differential element, whereby values thereof are added by an addition computing unit.

The front wheel side PWM control unit 532 varies a duty ratio ($=t/T\times100(\%)$) with a pulse width (t) of a certain period (T) to perform PWM control of an opening amount of the front wheel side electromagnetic valve 270 (a voltage applied to a coil of the front wheel side electromagnetic valve 270). When PWM control is performed, the voltage applied to the coil of the front wheel side electromagnetic valve 270 is applied in a pulse shape in accordance with the duty ratio. At this point, due to the impedance of the coil 271 of the front wheel side electromagnetic valve 270, the current flowing through the coil 271 is unable to change so as to follow the voltage applied in a pulse shape and is outputted in a dulled state. As a result, the current flowing through the coil of the front wheel side electromagnetic valve 270 is increased/decreased in proportion to the duty ratio. As the front wheel side PWM control unit 532, for example, a configuration can be exemplified in which the duty ratio is set to zero when the front wheel side target current is zero and the duty ratio is set to 100% when the front wheel side target current is the maximum current described earlier or a first target current A1 (to be described later).

In a similar manner, the rear wheel side PWM control unit 542 varies a duty ratio to perform PWM control of an opening amount of the rear wheel side electromagnetic valve 170 (a voltage applied to a coil of the rear wheel side electromagnetic valve 170). When PWM control is performed, the voltage applied to the coil 171 of the rear wheel side electromagnetic valve 170 is applied in a pulse shape in accordance with the duty ratio and the current flowing through the coil 171 of the rear wheel side electromagnetic valve 170 increases/decreases in proportion to the duty ratio. As the rear wheel side PWM control unit 542, for example, a configuration can be exemplified in which the duty ratio is set to zero when the rear wheel side target current is zero and the duty ratio is set to 100% when the rear wheel side target current is the maximum current described earlier or a second target current A2 (to be described later).

The front wheel side electromagnetic valve driving unit 533 includes a transistor (FET) as a switching element that is connected between, for example, a positive electrode side line of a power supply and the coil of the front wheel side electromagnetic valve 270. By driving a gate of the transistor and performing a switching operation of the transistor, driving of the front wheel side electromagnetic valve 270 is controlled. The rear wheel side electromagnetic valve driving unit 543 includes a transistor connected between, for example, the positive electrode side line of the power supply and the coil of the rear wheel side electromagnetic valve 170. By driving a gate of the transistor and performing a switching operation of the transistor, driving of the rear wheel side electromagnetic valve 170 is controlled.

The front wheel side detecting unit 534 detects a value of an actual current flowing through the front wheel side electromagnetic valve 270 from voltage generated between both ends of a shunt resistor connected to the front wheel side electromagnetic valve driving unit 533. The rear wheel side detecting unit 544 detects a value of an actual current flowing through the rear wheel side electromagnetic valve 170 from voltage generated between both ends of a shunt resistor connected to the rear wheel side electromagnetic valve driving unit 543.

With the motorcycle 1 configured as described above, the electromagnetic valve control unit 57 of the control device 50 determines a target current based on a target vehicle height in accordance with an operating position of the vehicle height adjusting switch 34 and PWM control is performed so that an actual current supplied to the front wheel side electromagnetic valve 270 and the rear wheel side electromagnetic valve 170 equals the determined target current. In other words, the front wheel side PWM control unit 532 and the rear wheel side PWM control unit 542 of the electromagnetic valve control unit 57 vary duty ratios in order to control power that is supplied to the coils 271 and 171 of the front wheel side electromagnetic valve 270 and the rear wheel side electromagnetic valve 170 and to control the front wheel side electromagnetic valve 270 and the rear wheel side electromagnetic valve 170 to desired opening amounts. Accordingly, since the control device 50 is capable of changing the vehicle height to a desired height in accordance with an operating position of the vehicle height adjusting switch 34, the vehicle height can be changed in multiple steps.

In addition, in the control device 50 described above, the front wheel side target current determining unit 511 determines the front wheel side target current to be a value in accordance with an operating position of the vehicle height adjusting switch 34 when the vehicle speed Vc is equal to or higher than the rising vehicle speed Vu and the front wheel side PWM control unit 532 sets the duty ratio so that the current supplied to the front wheel side electromagnetic valve 270 assumes a value in accordance with the operating position of the vehicle height adjusting switch 34. Accordingly, the current flowing through the coil 271 of the front wheel side electromagnetic valve 270 can be reduced in comparison to a case where voltage is applied in a non-pulse shape (continuously) to the coil 271. As a result, heat generation by the front wheel side electromagnetic valve 270 can be suppressed and power saving and downsizing can be achieved.

In a similar manner, in the control device 50 described above, the rear wheel side target current determining unit 512 determines the rear wheel side target current to be a value in accordance with an operating position of the vehicle height adjusting switch 34 when the vehicle speed Vc is equal to or higher than the rising vehicle speed Vu and the rear wheel side PWM control unit 542 sets the duty ratio so that the current supplied to the rear wheel side electromagnetic valve 170 assumes a value in accordance with the operating position of the vehicle height adjusting switch 34. Accordingly, the current flowing through the coil 171 of the rear wheel side electromagnetic valve 170 can be reduced in comparison to a case where voltage is applied in a non-pulse shape (continuously) to the coil 171. As a result, heat generation by the rear wheel side electromagnetic valve 170 can be suppressed and power saving and downsizing can be achieved.

Second Embodiment

Figure 15:
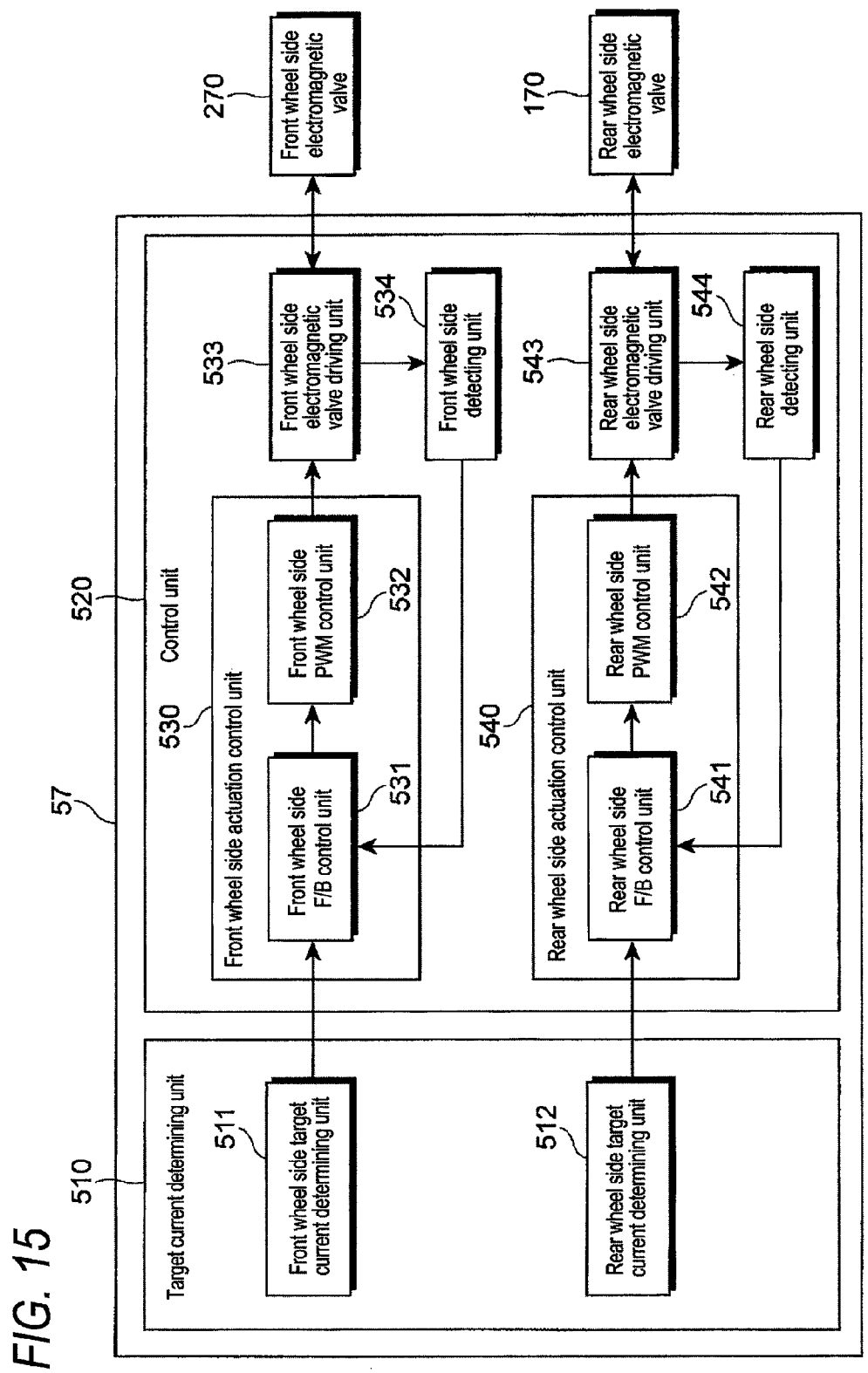
FIG. 15 is a block diagram of an electromagnetic valve control unit according to a second embodiment.

FIG. 15 is a block diagram of the electromagnetic valve control unit 57 according to a second embodiment.

The electromagnetic valve control unit 57 according to the second embodiment differs from the control device 50 according to the first embodiment in that the front wheel side target current determining unit 511 and the rear wheel side target current determining unit 512 determine a front wheel side target current and a rear wheel side target current based on the vehicle speed Vc acquired by the vehicle speed acquiring unit 56. Hereinafter, only matters that differ from the electromagnetic valve control unit 57 according to the first embodiment will be described and descriptions of same matters will be omitted.

The electromagnetic valve control unit 57 includes the target current determining unit 510 that determines a target current to be supplied to the front wheel side electromagnetic valve 270 of the front wheel side relative position changing device 240 and the rear wheel side electromagnetic valve 170 of the rear wheel side relative position changing device 140 and the control unit 520 that performs feedback control and the like based on the target current determined by the target current determining unit 510.

The target current determining unit 510 includes the front wheel side target current determining unit 511 which determines a front wheel side target current that is a target current of the front wheel side electromagnetic valve 270 based on the vehicle speed Vc acquired by the vehicle speed acquiring unit 56 and the rear wheel side target current determining unit 512 which determines a rear wheel side target current that is a target current of the rear wheel side electromagnetic valve 170 based on the vehicle speed Vc acquired by the vehicle speed acquiring unit 56.

Figure 16A:
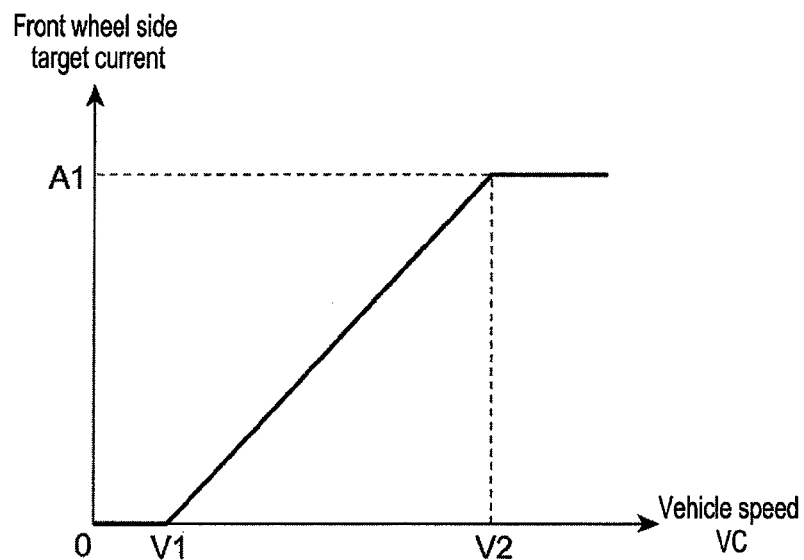
FIG. 16A is a diagram showing a correlation between a vehicle speed and a front wheel side target current.
Figure 16B:
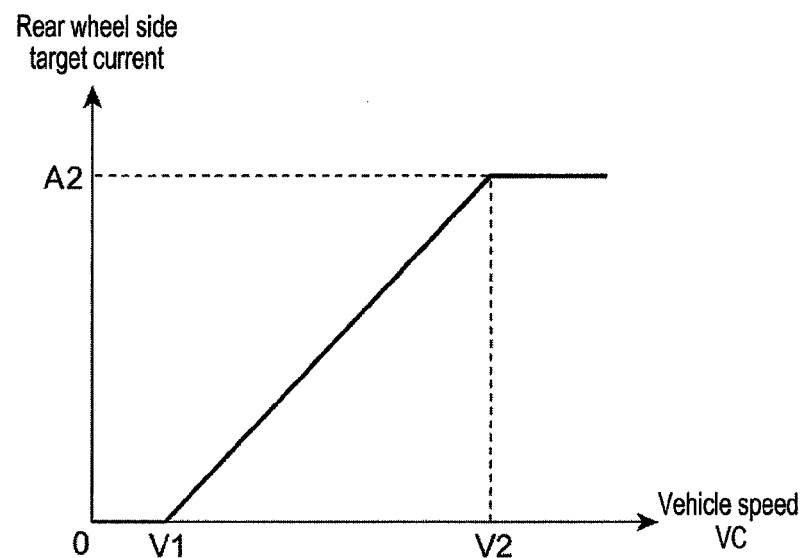
FIG. 16B is a diagram showing a correlation between the vehicle speed and a rear wheel side target current.

FIG. 16A is a diagram showing a correlation between the vehicle speed Vc and the front wheel side target current. FIG. 16B is a diagram showing a correlation between the vehicle speed Vc and the rear wheel side target current.

The front wheel side target current determining unit 511 determines a front wheel side target current by, for example, substituting the vehicle speed Vc acquired by the vehicle speed acquiring unit 56 into a map which is empirically created in advance and stored in the ROM and which shows a correspondence between the vehicle speed Vc and the front wheel side target current such as that shown in FIG. 16A. In the example shown in FIG. 16A, the front wheel side target current is set to zero when the vehicle speed Vc is lower than a prescribed first vehicle speed V1 and the front wheel side target current is set to a prescribed first target current A1 when the vehicle speed Vc is higher than a prescribed second vehicle speed V2. In addition, when the vehicle speed Vc is equal to or higher than the prescribed first vehicle speed V1 and equal to or lower than the prescribed second vehicle speed V2, the front wheel side target current is set to a value that gradually varies from zero to the first target current A1 as the vehicle speed Vc increases. Moreover, the first target current A1 is set to a current amount that causes the front wheel side electromagnetic valve 270 to fully close.

The rear wheel side target current determining unit 512 calculates a rear wheel side target current by, for example, substituting the vehicle speed Vc acquired by the vehicle speed acquiring unit 56 into a map which is empirically created in advance and stored in the ROM and which shows a correspondence between the vehicle speed Vc and the rear wheel side target current such as that shown in FIG. 16B. In the example shown in FIG. 16B, the rear wheel side target current is set to zero when the vehicle speed Vc is lower than a prescribed first vehicle speed V1 and the rear wheel side target current is set to a prescribed second target current A2 when the vehicle speed Vc is higher than a prescribed second vehicle speed V2. In addition, when the vehicle speed Vc is equal to or higher than the prescribed first vehicle speed V1 and equal to or lower than the prescribed second vehicle speed V2, the rear wheel side target current is set to a value that gradually varies from zero to the second target current A2 as the vehicle speed Vc increases. Moreover, the second target current A2 is set to a current amount that causes the rear wheel side electromagnetic valve 170 to fully close.

With the motorcycle 1 configured as described above, since the electromagnetic valve control unit 57 of the control device 50 determines a target current in accordance with the vehicle speed Vc and PWM control is performed so that an actual current supplied to the front wheel side electromagnetic valve 270 and the rear wheel side electromagnetic valve 170 equals the determined target current, the vehicle height can be steplessly changed in accordance with the vehicle speed Vc. In other words, the front wheel side PWM control unit 532 and the rear wheel side PWM control unit 542 of the electromagnetic valve control unit 57 vary duty ratios in order to control power that is supplied to the coils 271 and 171 of the front wheel side electromagnetic valve 270 and the rear wheel side electromagnetic valve 170 and to control the front wheel side electromagnetic valve 270 and the rear wheel side electromagnetic valve 170 to desired opening amounts. Accordingly, since the control device 50 is capable of changing the vehicle height to a desired height in accordance with the vehicle speed Vc, the vehicle height can be steplessly changed.

In addition, in the control device 50 described above, the front wheel side target current determining unit 511 may determine the front wheel side target current to be the first target current A1 when the vehicle speed Vc is higher than the second vehicle speed V2 and the front wheel side PWM control unit 532 may set the duty ratio when the front wheel side target current is equal to the first target current A1 to lower than 100% to, for example, 90%. In this manner, by setting the duty ratio when the first target current A1 that is a maximum current is supplied to the front wheel side electromagnetic valve 270 to lower than 100%, the voltage applied to the coil 271 of the front wheel side electromagnetic valve 270 assumes a pulse shape when the front wheel side electromagnetic valve 270 is fully closed. Accordingly, the current flowing through the coil 271 can be reduced in comparison to a case where voltage is applied in a non-pulse shape (continuously) to the coil 271 in order to maintain a fully-closed state of the front wheel side electromagnetic valve 270. As a result, heat generation by the front wheel side electromagnetic valve 270 can be suppressed and power saving and downsizing can be achieved.

In a similar manner, in the control device 50 described above, the rear wheel side target current determining unit 512 may determine the rear wheel side target current to be the second target current A2 when the vehicle speed Vc is higher than the second vehicle speed V2 and the rear wheel side PWM control unit 542 may set the duty ratio when the rear wheel side target current is equal to the second target current A2 to lower than 100% to, for example, 90%. In this manner, by setting the duty ratio when the second target current A2 that is a maximum current is supplied to the rear wheel side electromagnetic valve 170 to lower than 100%, the current flowing through the coil 171 can be reduced in comparison to a case where voltage is applied in a non-pulse shape (continuously) to the coil 171 in order to maintain a fully-closed state of the rear wheel side electromagnetic valve 170. As a result, heat generation by the rear wheel side electromagnetic valve 170 can be suppressed and power saving and downsizing can be achieved.

Moreover, for example, in a case where the motorcycle 1 is accelerated from a stopped state until a vehicle speed thereof exceeds the second vehicle speed V2 and travels at a vehicle speed that is higher than the second vehicle speed V2, the front wheel side target current and the rear wheel side target current are gradually increased from zero to the first target current A1 and the second target current A2 and are subsequently maintained at the first target current A1 and the second target current A2. In this manner, when the front wheel side target current and the rear wheel side target current are initially increased from values smaller than the first target current A1 and the second target current A2 to the first target current A1 and the second target current A2, the front wheel side PWM control unit 532 and the rear wheel side PWM control unit 542 may initially set the duty ratio to 100% and subsequently change the duty ratio to lower than 100% after a prescribed amount of time has elapsed. Accordingly, the vehicle height can be increased quickly and, at the same time, heat generation attributable to the duty ratio being continuously set to 100% can be suppressed. In addition, after changing the duty ratio to lower than 100%, when it is recognized that the vehicle height has been reduced from a highest state based on the front wheel side travel amount Lf or the rear wheel side travel amount Lr acquired by the front wheel side travel amount acquiring unit 53 or the rear wheel side travel amount acquiring unit 54, the duty ratio may be changed to 100% to set the vehicle height to the highest state and subsequently changed to lower than 100% after a prescribed amount of time has elapsed. Furthermore, this process may be repetitively performed as long as the vehicle speed Vc of the motorcycle 1 is higher than the second vehicle speed V2.

Moreover, while the front wheel side relative position detecting unit 295 and the rear wheel side relative position detecting unit 195 are so-called stroke sensors, the front wheel side travel amount acquiring unit 53 and the rear wheel side travel amount acquiring unit 54 acquire the front wheel side travel amount Lf and the rear wheel side travel amount Lr based on detected values from the front wheel side relative position detecting unit 295 and the rear wheel side relative position detecting unit 195, and the front wheel side PWM control unit 532 and the rear wheel side PWM control unit 542 change the duty ratio to 100% based on the front wheel side travel amount Lf and the rear wheel side travel amount Lr, this mode is not restrictive. For example, a sensor that detects whether or not the front fork 13 or the rear suspension 22 is in a maximum state may be provided, whereby the front wheel side PWM control unit 532 or the rear wheel side PWM control unit 542 may change the duty ratio to 100% when the sensor does not detect a maximum state.

Third Embodiment

The control device 50 of the motorcycle 1 according to the third embodiment differs from the control device 50 according to the second embodiment in that the front wheel side target current determining unit 511 and the rear wheel side target current determining unit 512 determine a front wheel side target current and a rear wheel side target current based on a load detected by the load detecting sensor 33. Hereinafter, only matters that differ from the control device 50 according to the second embodiment will be described and descriptions of same matters will be omitted.

Figure 17A:
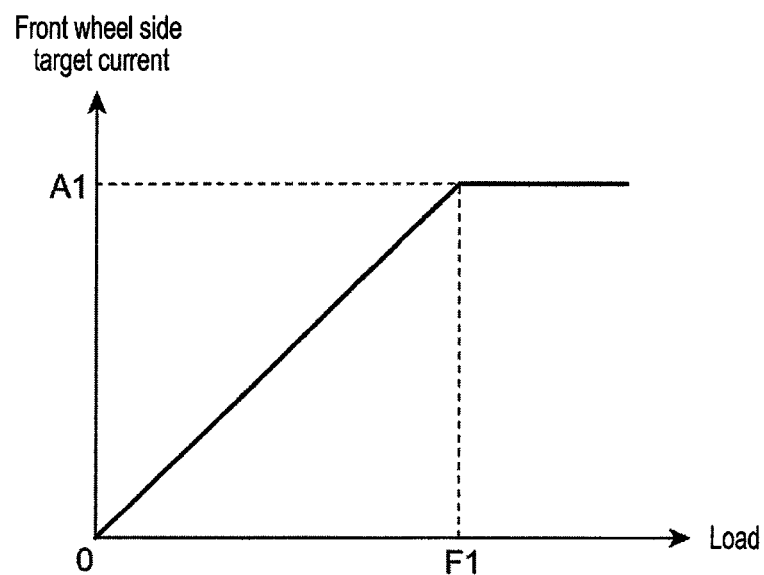
FIG. 17A is a diagram showing a correlation between a load detected by a load detecting sensor and a front wheel side target current.
Figure 17B:
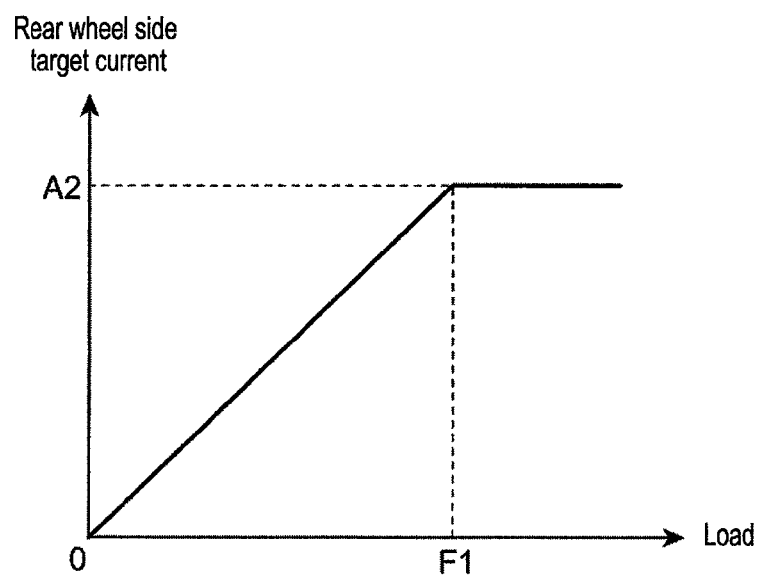
FIG. 17B is a diagram showing a correlation between the load detected by the load detecting sensor and a rear wheel side target current.

FIG. 17A is a diagram showing a correlation between a load detected by the load detecting sensor 33 and a front wheel side target current. FIG. 17B is a diagram showing a correlation between the load detected by the load detecting sensor 33 and a rear wheel side target current.

The front wheel side target current determining unit 511 determines a front wheel side target current by, for example, substituting a load detected by the load detecting sensor 33 into a map which is empirically created in advance and stored in the ROM and which shows a correspondence between the load detected by the load detecting sensor 33 and the front wheel side target current such as that shown in FIG. 17A. In the example shown in FIG. 17A, the front wheel side target current is set to the first target current A1 when the load detected by the load detecting sensor 33 is larger than a prescribed first load F1, and the front wheel side target current is set to a value that gradually varies from zero to the first target current A1 as the load detected by the load detecting sensor 33 increases from zero when the load is equal to or larger than zero and equal to or smaller than the first load F1.

The rear wheel side target current determining unit 512 determines a rear wheel side target current by, for example, substituting a load detected by the load detecting sensor 33 into a map which is empirically created in advance and stored in the ROM and which shows a correspondence between the load detected by the load detecting sensor 33 and the rear wheel side target current such as that shown in FIG. 17B. In the example shown in FIG. 17B, the rear wheel side target current is set to the second target current A2 when the load detected by the load detecting sensor 33 is larger than the first load F1, and the rear wheel side target current is set to a value that gradually varies from zero to the second target current A2 as the load detected by the load detecting sensor 33 increases from zero when the load is equal to or larger than zero and equal to or smaller than the first load F1.

With the motorcycle 1 according to the third embodiment which is configured as described above, since the electromagnetic valve control unit 57 of the control device 50 determines a target current in accordance with the load detected by the load detecting sensor 33 or, in other words, a weight of a rider or a weight of luggage, and PWM control is performed so that an actual current supplied to the front wheel side electromagnetic valve 270 and the rear wheel side electromagnetic valve 170 equals the determined target current, the vehicle height can be steplessly changed in accordance with the load.

Fourth Embodiment

The control device 50 of the motorcycle 1 according to the fourth embodiment differs from the control device 50 according to the second embodiment in that the front wheel side target current determining unit 511 and the rear wheel side target current determining unit 512 determine a front wheel side target current and a rear wheel side target current also based on a load detected by the load detecting sensor 33. Hereinafter, only matters that differ from the control device 50 according to the second embodiment will be described and descriptions of same matters will be omitted.

Figure 18A:
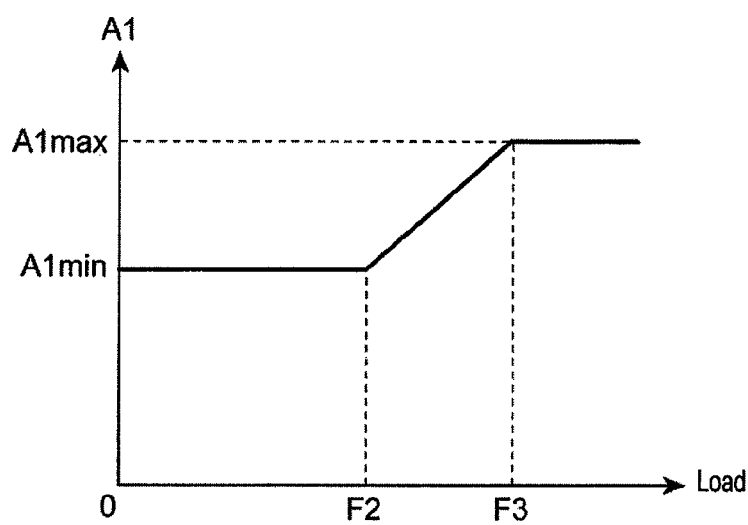
FIG. 18A is a diagram showing a correlation between a load detected by the load detecting sensor and a first target current.
Figure 18B:
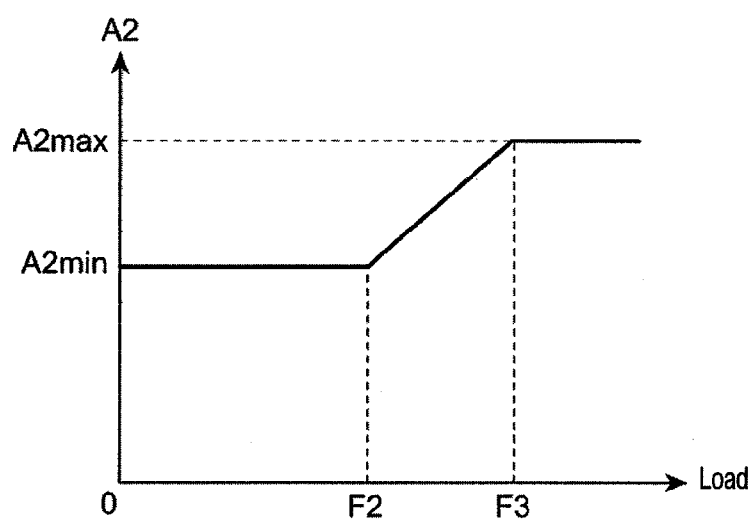
FIG. 18B is a diagram showing a correlation between the load detected by the load detecting sensor and a second target current.

FIG. 18A is a diagram showing a correlation between a load detected by the load detecting sensor 33 and a first target current. FIG. 18B is a diagram showing a correlation between the load detected by the load detecting sensor 33 and a second target current A2.

The front wheel side target current determining unit 511 first determines the first target current A1 that is set when the vehicle speed Vc is higher than the second vehicle speed V2 by, for example, substituting a load detected by the load detecting sensor 33 into a map which is empirically created in advance and stored in the ROM and which shows a correspondence between the load and the first target current A1 such as that shown in FIG. 18A. Subsequently, the front wheel side target current determining unit 511 determines a front wheel side target current by, for example, substituting the vehicle speed Vc acquired by the vehicle speed acquiring unit 56 into a map which is empirically created in advance and stored in the ROM and which shows a correspondence between the vehicle speed Vc and the front wheel side target current such as that shown in FIG. 16A. In the example shown in FIG. 18A, the first target current A1 is set to a prescribed minimum first target current A1min when the load is smaller than a prescribed second load F2, and the first target current A1 is set to a prescribed maximum first target current A1max when the load is larger than a prescribed third load F3. In addition, when the load is equal to or larger than the second load F2 and equal to or smaller than the third load F3, the first target current A1 is set to a value that gradually varies from the minimum first target current A1min to the maximum first target current A1max as the load increases.

The rear wheel side target current determining unit 512 first determines the second target current A2 that is set when the vehicle speed Vc is higher than the second vehicle speed V2 by, for example, substituting a load detected by the load detecting sensor 33 into a map which is empirically created in advance and stored in the ROM and which shows a correspondence between the load and the second target current A2 such as that shown in FIG. 18B. Subsequently, the rear wheel side target current determining unit 512 determines a rear wheel side target current by, for example, substituting the vehicle speed Vc acquired by the vehicle speed acquiring unit 56 into a map which is empirically created in advance and stored in the ROM and which shows a correspondence between the vehicle speed Vc and the rear wheel side target current such as that shown in FIG. 16B. In the example shown in FIG. 18B, the second target current A2 is set to a prescribed minimum second target current A2min when the load is smaller than the second load F2, and the second target current A2 is set to a prescribed maximum second target current A2max when the load is larger than the third load F3. In addition, when the load is equal to or larger than the second load F2 and equal to or smaller than the third load F3, the second target current A2 is set to a value that gradually varies from the minimum second target current A2 min to the maximum second target current A2max as the load increases.

With the motorcycle 1 according to the fourth embodiment which is configured as described above, since the electromagnetic valve control unit 57 of the control device 50 determines a target current in accordance with a vehicle speed and a load and PWM control is performed so that an actual current supplied to the front wheel side electromagnetic valve 270 and the rear wheel side electromagnetic valve 170 equals the determined target current, the vehicle height can be steplessly changed in accordance with the vehicle speed and the load. Accordingly, user convenience can be improved.

Fifth Embodiment

The motorcycle 1 according to a fifth embodiment differs from the motorcycle 1 according to the second embodiment in that the motorcycle 1 includes the vehicle height adjusting switch 34 (refer to FIG. 13) described in the first embodiment in the vicinity of, for example, a speedometer, and the vehicle height is adjusted in accordance with which position the vehicle height adjusting switch 34 is operated to. Hereinafter, only matters that differ from the control device 50 according to the second embodiment will be described and descriptions of same matters will be omitted.

FIG. 19A is a diagram showing a correspondence between an operating position of the vehicle height adjusting switch 34 and a front wheel side target current, and FIG. 19B is a diagram showing a correspondence between the operating position of the vehicle height adjusting switch 34 and a rear wheel side target current.

When the vehicle height adjusting switch 34 is set to a "low" position, the front wheel side target current determining unit 511 determines the front wheel side target current to be zero in accordance with the correspondence shown in FIG. 19A. In a similar manner, when the vehicle height adjusting switch 34 is set to "medium" and "high" positions, the front wheel side target current determining unit 511 determines respective front wheel side target currents to be ½ of the first target current A1 (=A1/2) and the first target current A1 in accordance with the correspondence shown in FIG. 19A.

In addition, when the vehicle height adjusting switch 34 is set to the "low" position, the rear wheel side target current determining unit 512 determines the rear wheel side target current to be zero in accordance with the correspondence shown in FIG. 19B. In a similar manner, when the vehicle height adjusting switch 34 is set to the "medium" and "high" positions, the rear wheel side target current determining unit 512 respectively determines the rear wheel side target current to be ½ of the second target current A2 (=A2/2) and the second target current A2 in accordance with the correspondence shown in FIG. 19B.

With the motorcycle 1 according to the fifth embodiment which is configured as described above, the electromagnetic valve control unit 57 of the control device 50 determines a target current in accordance with an operating position of the vehicle height adjusting switch 34 and PWM control is performed so that an actual current supplied to the front wheel side electromagnetic valve 270 and the rear wheel side electromagnetic valve 170 equals the determined target current. Accordingly, the control device 50 can adjust the vehicle height in multiple stages in accordance with the operating position of the vehicle height adjusting switch 34. As shown, the user can personally select a vehicle height position in a user-friendly manner. For example, the user may set the vehicle height adjusting switch 34 to the "low" position to enable easier mounting/dismounting during a stop and may set the vehicle height adjusting switch 34 to the "medium" position in order to enhance traveling performance after mounting or after start of traveling. In addition, when riding in tandem or when there is a lot of luggage, the vehicle height adjusting switch 34 may be set to the "high" position in order to enhance traveling performance. In this manner, with the motorcycle 1 according to the fifth embodiment, since the vehicle height may be adjusted in accordance with usage of the user, user convenience can be improved.

Sixth Embodiment

In the motorcycle 1 according to a sixth embodiment, a configuration of the electromagnetic valve control unit 57 differs from the configuration of the electromagnetic valve control unit 57 according to the second embodiment. Hereinafter, only matters that differ from the motorcycle 1 according to the second embodiment will be described and descriptions of same matters will be omitted.

Figure 20:
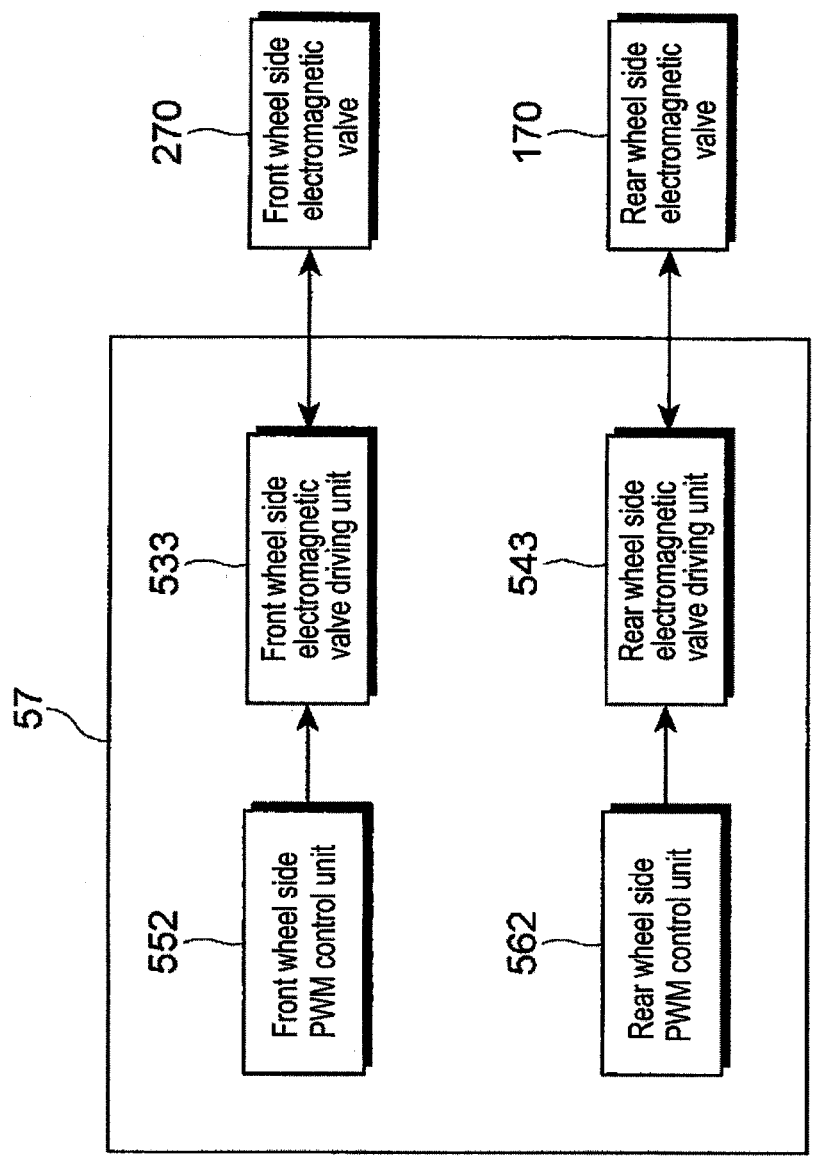
FIG. 20 is an overall configuration diagram of an electromagnetic valve control unit according to a sixth embodiment.

FIG. 20 is an overall configuration diagram of the electromagnetic valve control unit 57 according to the sixth embodiment.

The electromagnetic valve control unit 57 according to the sixth embodiment is constituted by a front wheel side PWM control unit 552 that performs PWM control on the front wheel side electromagnetic valve 270, the front wheel side electromagnetic valve driving unit 533 that drives the front wheel side electromagnetic valve 270, a rear wheel side PWM control unit 562 that performs PWM control of the rear wheel side electromagnetic valve 170, and the rear wheel side electromagnetic valve driving unit 543 that drives the rear wheel side electromagnetic valve 170.

In addition, the front wheel side PWM control unit 552 and the rear wheel side PWM control unit 562 according to the sixth embodiment vary the duty ratio based on the vehicle speed Vc acquired by the vehicle speed acquiring unit 56 and perform PWM control of opening amounts of the front wheel side electromagnetic valve 270 and the rear wheel side electromagnetic valve 170.

Figure 21A:
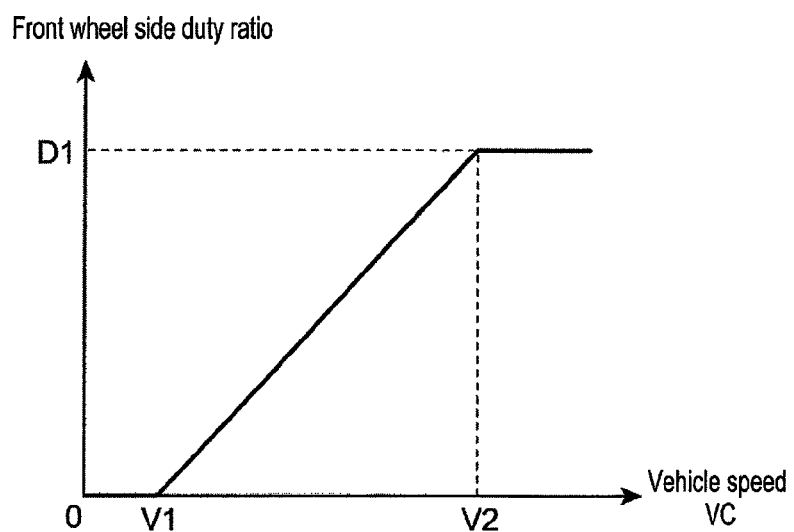
FIG. 21A is a diagram showing a correlation between a vehicle speed and a duty ratio that is set by a front wheel side PWM control unit.
Figure 21B:
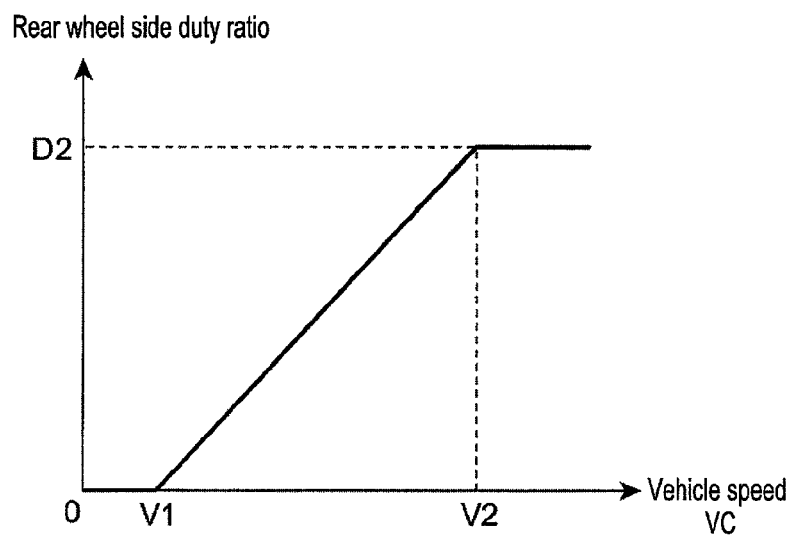
FIG. 21B is a diagram showing a correlation between the vehicle speed and a duty ratio that is set by a rear wheel side PWM control unit.

FIG. 21A is a diagram showing a correlation between the vehicle speed Vc and a duty ratio that is set by the front wheel side PWM control unit 552. FIG. 21B is a diagram showing a correlation between the vehicle speed Vc and a duty ratio that is set by the rear wheel side PWM control unit 562.

The front wheel side PWM control unit 552 determines a front wheel side duty ratio by, for example, substituting the vehicle speed Vc acquired by the vehicle speed acquiring unit 56 into a map which is empirically created in advance and stored in the ROM and which shows a correspondence between the vehicle speed Vc and the front wheel side duty ratio such as that shown in FIG. 21A. In the example shown in FIG. 21A, the front wheel side duty ratio is set to zero when the vehicle speed Vc is lower than the first vehicle speed V1 and the front wheel side duty ratio is set to a prescribed first duty ratio D1 when the vehicle speed Vc is higher than the second vehicle speed V2. In addition, when the vehicle speed Vc is equal to or higher than the first vehicle speed V1 and equal to or lower than the second vehicle speed V2, the front wheel side duty ratio is set to a value that gradually varies from zero to the first duty ratio D1 as the vehicle speed Vc increases. Moreover, the first duty ratio D1 is set to a value that causes the front wheel side electromagnetic valve 270 to be fully closed and a duty ratio of 100% or lower than 100% such as 90% can be exemplified.

The rear wheel side PWM control unit 562 determines a rear wheel side duty ratio by, for example, substituting the vehicle speed Vc acquired by the vehicle speed acquiring unit 56 into a map which is empirically created in advance and stored in the ROM and which shows a correspondence between the vehicle speed Vc and the rear wheel side duty ratio such as that shown in FIG. 21B. In the example shown in FIG. 21B, the rear wheel side duty ratio is set to zero when the vehicle speed Vc is lower than the first vehicle speed V1 and the rear wheel side duty ratio is set to a prescribed second duty ratio D2 when the vehicle speed Vc is higher than the second vehicle speed V2. In addition, when the vehicle speed Vc is equal to or higher than the first vehicle speed V1 and equal to or lower than the second vehicle speed V2, the rear wheel side duty ratio is set to a value that gradually varies from zero to the second duty ratio D2 as the vehicle speed Vc increases. Moreover, the second duty ratio D2 is set to a value that causes the rear wheel side electromagnetic valve 170 to be fully closed and a duty ratio of 100% or lower than 100% such as 90% can be exemplified.

Also in a case with the motorcycle 1 according to the sixth embodiment which is configured as described above, since the electromagnetic valve control unit 57 of the control device 50 performs PWM control so that a duty ratio in accordance with the vehicle speed Vc is set, the vehicle height can be steplessly changed in accordance with the vehicle speed. In other words, the front wheel side PWM control unit 552 and the rear wheel side PWM control unit 562 of the electromagnetic valve control unit 57 vary duty ratios in order to control power that is supplied to the coils 271 and 171 of the front wheel side electromagnetic valve 270 and the rear wheel side electromagnetic valve 170 and to control the front wheel side electromagnetic valve 270 and the rear wheel side electromagnetic valve 170 to desired opening amounts. Accordingly, since the control device 50 is capable of changing the vehicle height to a desired height in accordance with the vehicle speed, the vehicle height can be steplessly changed.

Moreover, the front wheel side PWM control unit 552 and the rear wheel side PWM control unit 562 of the electromagnetic valve control unit 57 of the motorcycle 1 according to the sixth embodiment vary the duty ratio based on the vehicle speed Vc acquired by the vehicle speed acquiring unit 56 in a similar manner to the electromagnetic valve control unit 57 according to the second embodiment. However, this mode is not restrictive. For example, the front wheel side PWM control unit 552 and the rear wheel side PWM control unit 562 may vary the duty ratio based on a load detected by the load detecting sensor 33 in a similar manner to the electromagnetic valve control unit 57 according to the third embodiment or vary the duty ratio based on the vehicle speed Vc and the load detected by the load detecting sensor 33 in a similar manner to the electromagnetic valve control unit 57 according to the fourth embodiment. Alternatively, the front wheel side PWM control unit 552 and the rear wheel side PWM control unit 562 may vary the duty ratio based on an operating position of the vehicle height adjusting switch 34 in a similar manner to the electromagnetic valve control unit 57 according to the fifth embodiment. In other words, the front wheel side PWM control unit 552 and the rear wheel side PWM control unit 562 may determine the front wheel side duty ratio and the rear wheel side duty ratio to be zero when the vehicle height adjusting switch 34 is set to the "low" position and may determine the front wheel side duty ratio and the rear wheel side duty ratio to be ½ of the first duty ratio D1 (=D1/2), ½ of the second duty ratio D2 (=D2/2), the first duty ratio D1, and the second duty ratio D2 when the vehicle height adjusting switch 34 is set to the "medium" and "high" positions.

Seventh Embodiment

The motorcycle 1 according to a seventh embodiment differs from the motorcycles I according to the first to sixth embodiments in that the front wheel side electromagnetic valve 270 of the front wheel side relative position changing device 240 and the rear wheel side electromagnetic valve 170 of the rear wheel side relative position changing device 140 are so-called normally-closed type electromagnetic valves. In addition, in accordance with the difference in types of the front wheel side electromagnetic valve 270 and the rear wheel side electromagnetic valve 170, a duty ratio that is applied to the coil by the electromagnetic valve control unit 57 according to the seventh embodiment is inversely proportional to the duty ratio that is applied to the coil by the electromagnetic valve control units 57 according to the first to sixth embodiments.

In the case of a normally-closed type electromagnetic valve, during non-energization in which the coil is not energized in the front wheel side electromagnetic valve 270 and the rear wheel side electromagnetic valve 170, the valve body abuts the valve seat and communication between the inward guiding path and the outward guiding path is cut off to create a valve-closed state. On the other hand, during energization in which the coil is energized in the front wheel side electromagnetic valve 270 and the rear wheel side electromagnetic valve 170, the movable iron core is displaced due to a balance between the attractive force of the fixed iron core that is generated as the coil is excited due to energization and the biasing force of the spring. As a result, a position of the valve body with respect to the valve seat or, in other words, the opening amount of the valve is adjusted. Specifically, the opening amounts of the front wheel side electromagnetic valve 270 and the rear wheel side electromagnetic valve 170 according to the seventh embodiment which are normally-closed type electromagnetic valves increase in proportion to power (current, voltage) supplied to the coil and therefore differ from the front wheel side electromagnetic valves 270 and the rear wheel side electromagnetic valves 170 according to the first to sixth embodiments which are normally-open type electromagnetic valves and whose opening amounts increase in inverse proportion to the power (current, voltage) supplied to the coil.

Figure 22A:
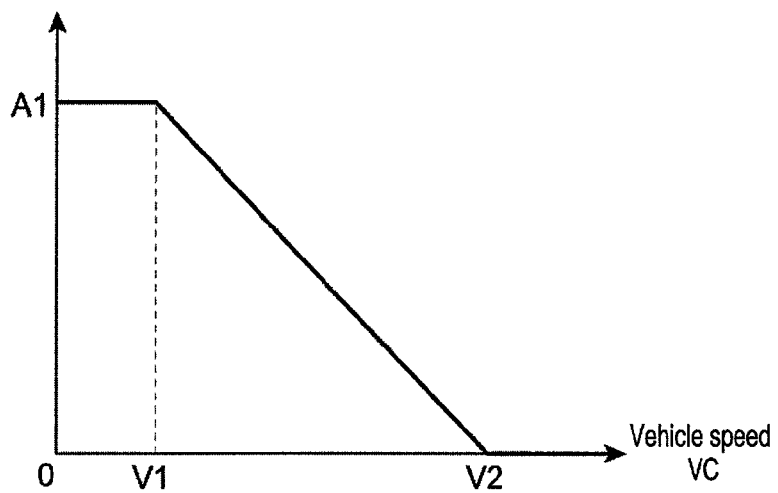
FIG. 22A is a diagram showing a correlation between a vehicle speed and a front wheel side target current.
Figure 22B:
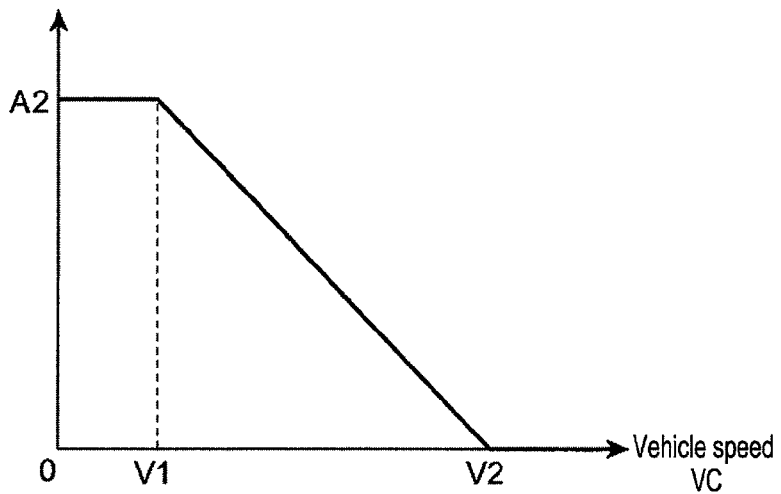
FIG. 22B is a diagram showing a correlation between the vehicle speed and a rear wheel side target current.

FIG. 22A is a diagram showing a correlation between the vehicle speed Vc and a front wheel side target current, and FIG. 22B is a diagram showing a correlation between the vehicle speed Vc and a rear wheel side target current.

In a map showing a correspondence between the vehicle speed Vc and the front wheel side target current which is used by the front wheel side target current determining unit 511 according to the seventh embodiment, as shown in FIG. 22A, an opposite relationship to the correlation shown in FIG. 16A is established, and the front wheel side target current is set to the first target current A1 when the vehicle speed Vc is lower than the first vehicle speed V1 and the front wheel side target current is set to zero when the vehicle speed Vc is higher than the second vehicle speed V2. In addition, when the vehicle speed Vc is equal to or higher than the first vehicle speed V1 and equal to or lower than the second vehicle speed V2, the front wheel side target current is set to a value that gradually varies from the first target current A1 to zero as the vehicle speed Vc increases. Moreover, the first target current A1 is set to a current amount that causes the front wheel side electromagnetic valve 270 to be fully opened.

In addition, in a map showing a correspondence between the vehicle speed Vc and the rear wheel side target current which is used by the rear wheel side target current determining unit 512 according to the seventh embodiment, as shown in FIG. 22B, an opposite relationship to the correlation shown in FIG. 16B is established, and the rear wheel side target current is set to the second target current A2 when the vehicle speed Vc is lower than the first vehicle speed V1 and the rear wheel side target current is set to zero when the vehicle speed Vc is higher than the second vehicle speed V2. Furthermore, when the vehicle speed Vc is equal to or higher than the first vehicle speed V1 and equal to or lower than the second vehicle speed V2, the rear wheel side target current is set to a value that gradually varies from the second target current A2 to zero as the vehicle speed Vc increases. Moreover, the second target current A2 is set to a current amount that causes the rear wheel side electromagnetic valve 170 to be fully opened.

Figure 23A:
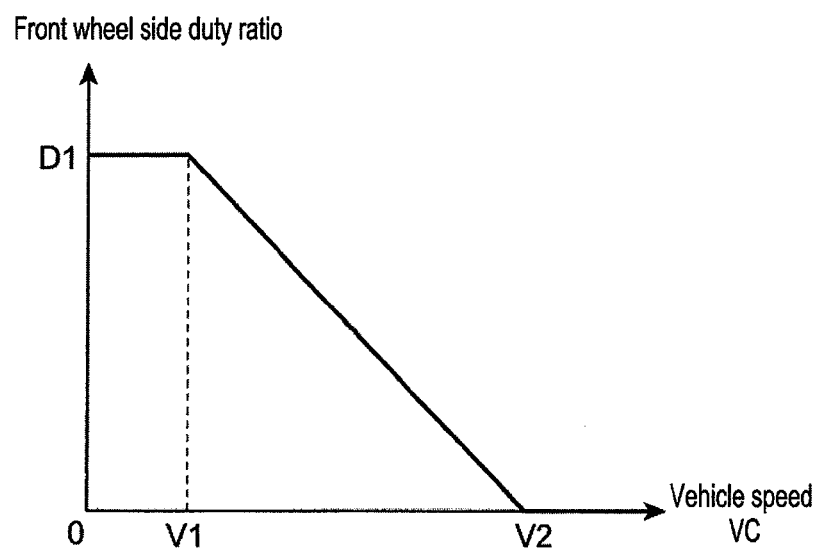
FIG. 23A is a diagram showing a correlation between a vehicle speed and a duty ratio that is set by a front wheel side PWM control unit.
Figure 23B:
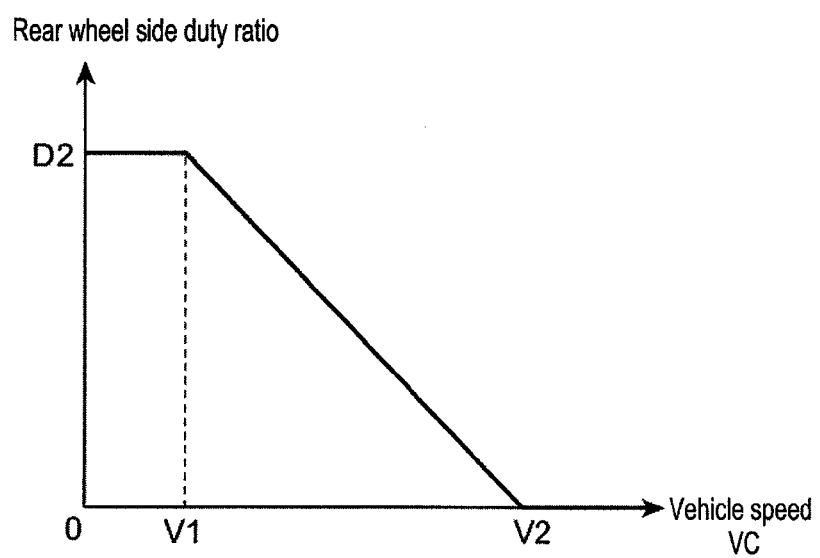
FIG. 23B is a diagram showing a correlation between the vehicle speed and a duty ratio that is set by a rear wheel side PWM control unit.

FIG. 23A is a diagram showing a correlation between the vehicle speed Vc and a duty ratio that is set by the front wheel side PWM control unit 552. FIG. 23B is a diagram showing a correlation between the vehicle speed Vc and a duty ratio that is set by the rear wheel side PWM control unit 562.

In a map showing a correspondence between the vehicle speed Vc and the front wheel side duty ratio which is used by the front wheel side PWM control unit 552 according to the seventh embodiment, as shown in FIG. 23A, an opposite relationship to the correlation shown in FIG. 21A is established, and the front wheel side duty ratio is set to the first duty ratio D1 when the vehicle speed Vc is lower than the first vehicle speed V1 and the front wheel side duty ratio is set to zero when the vehicle speed Vc is higher than the second vehicle speed V2. In addition, when the vehicle speed Vc is equal to or higher than the first vehicle speed V1 and equal to or lower than the second vehicle speed V2, the front wheel side duty ratio is set to a value that gradually varies from the first duty ratio D1 to zero as the vehicle speed Vc increases. Moreover, the first duty ratio D1 is set to a value that causes the front wheel side electromagnetic valve 270 to be fully opened and a duty ratio of 100% or lower than 100% such as 90% can be exemplified.

In a map showing a correspondence between the vehicle speed Vc and the rear wheel side duty ratio which is used by the rear wheel side PWM control unit 562 according to the seventh embodiment, as shown in FIG. 23B, an opposite relationship to the correlation shown in FIG. 21B is established, and the rear wheel side duty ratio is set to the second duty ratio D2 when the vehicle speed Vc is lower than the first vehicle speed V1 and the rear wheel side duty ratio is set to zero when the vehicle speed Vc is higher than the second vehicle speed V2. In addition, when the vehicle speed Vc is equal to or higher than the first vehicle speed V1 and equal to or lower than the second vehicle speed V2, the rear wheel side duty ratio is set to a value that gradually varies from the second duty ratio D2 to zero as the vehicle speed Vc increases. Moreover, the second duty ratio D2 is set to a value that causes the rear wheel side electromagnetic valve 170 to be fully opened and a duty ratio of 100% or lower than 100% such as 90% can be exemplified.

Also in a case with the motorcycle 1 according to the seventh embodiment which includes the normally-closed type front wheel side electromagnetic valve 270 and the normally-closed type rear wheel side electromagnetic valve 170 configured as described above, the vehicle height can be steplessly changed in accordance with the vehicle speed, the load detected by the load detecting sensor 33, and the operating position of the vehicle height adjusting switch 34.

Eighth Embodiment

In the motorcycle 1 according to an eighth embodiment, a configuration of the electromagnetic valve control unit 57 differs from the configuration of the electromagnetic valve control unit 57 according to the second embodiment. Hereinafter, only matters that differ from the motorcycle 1 according to the second embodiment will be described and descriptions of same matters will be omitted.

Figure 24:
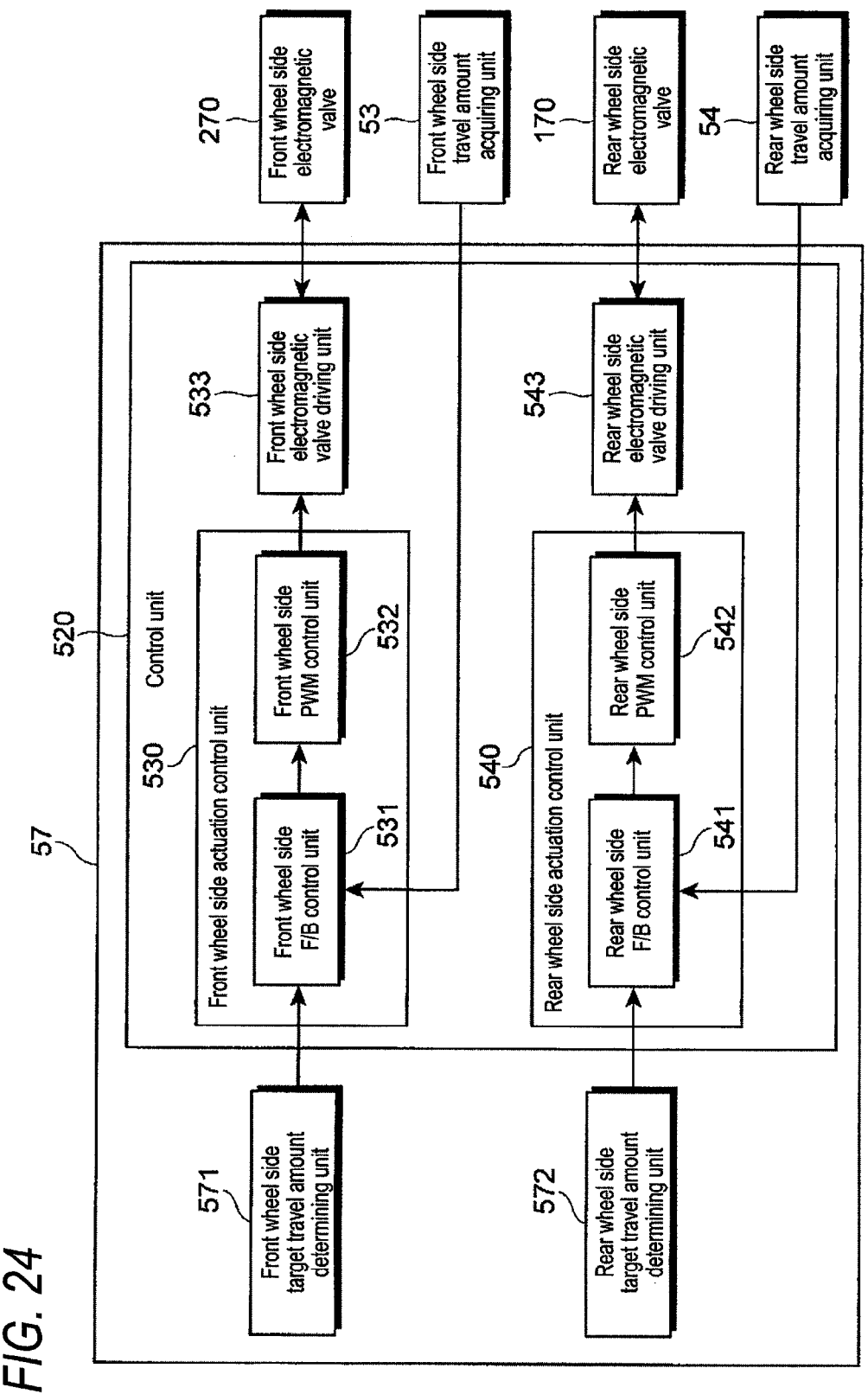
FIG. 24 is a block diagram of an electromagnetic valve control unit according to an eighth embodiment.

FIG. 24 is a block diagram of the electromagnetic valve control unit 57 according to the eighth embodiment.

The electromagnetic valve control unit 57 according to the eighth embodiment includes the front wheel side target travel amount determining unit 571 that determines a target travel amount of the front wheel side travel amount Lf based on the vehicle speed Vc acquired by the vehicle speed acquiring unit 56 and the rear wheel side target travel amount determining unit 572 that determines a target travel amount of the rear wheel side travel amount Lr based on the vehicle speed Vc acquired by the vehicle speed acquiring unit 56.

In addition, the front wheel side feedback (F/B) control unit 531 of the front wheel side actuation control unit 530 of the electromagnetic valve control unit 57 according to the eighth embodiment performs feedback control based on a deviation between the front wheel side target travel amount determined by the front wheel side target travel amount determining unit 571 and the actual front wheel side travel amount Lf acquired by the front wheel side travel amount acquiring unit 53. In addition, the rear wheel side feedback (F/B) control unit 541 of the rear wheel side actuation control unit 540 of the electromagnetic valve control unit 57 according to the eighth embodiment performs feedback control based on a deviation between the rear wheel side target travel amount determined by the rear wheel side target travel amount determining unit 572 and the actual rear wheel side travel amount Lr acquired by the rear wheel side travel amount acquiring unit 54.

Figure 25A:
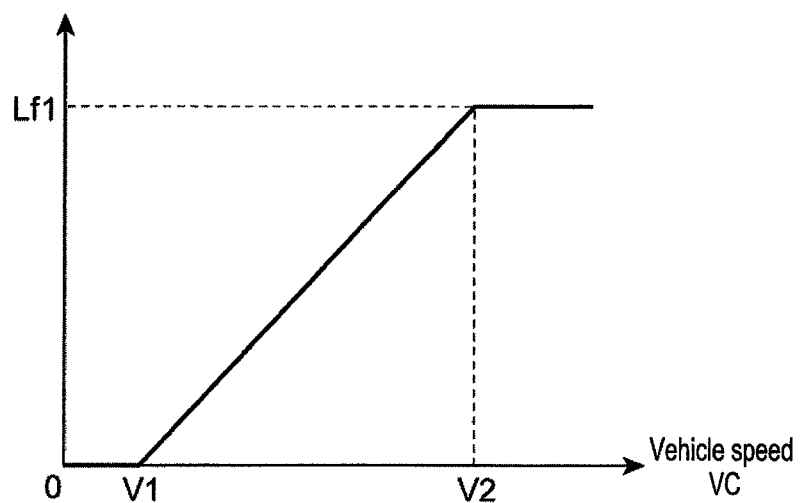
FIG. 25A is a diagram showing a correlation between a vehicle speed and a front wheel side target travel amount.
Figure 25B:
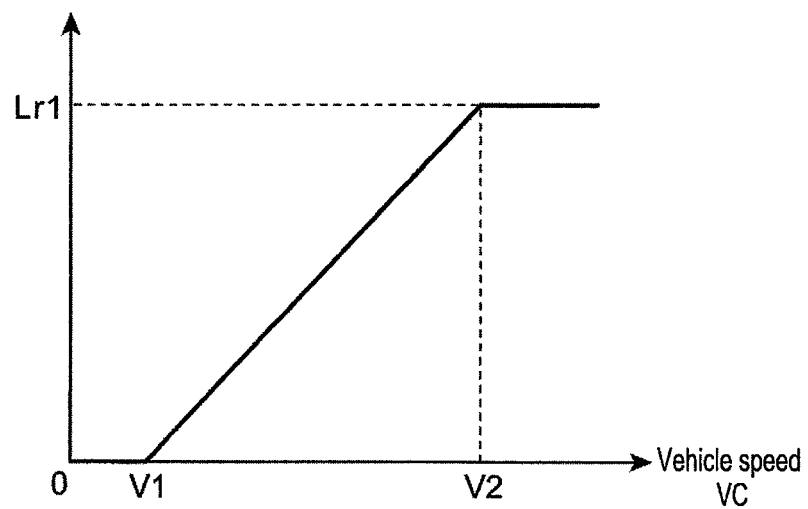
FIG. 25B is a diagram showing a correlation between the vehicle speed and a rear wheel side target travel amount.

FIG. 25A is a diagram showing a correlation between the vehicle speed Vc and a front wheel side target travel amount. FIG. 25B is a diagram showing a correlation between the vehicle speed Vc and a rear wheel side target travel amount.

The front wheel side target travel amount determining unit 571 determines a front wheel side target travel amount by, for example, substituting the vehicle speed Vc acquired by the vehicle speed acquiring unit 56 into a map which is empirically created in advance and stored in the ROM and which shows a correspondence between the vehicle speed Vc and the front wheel side target travel amount such as that shown in FIG. 25A. In the example shown in FIG. 25A, the front wheel side target travel amount is set to zero when the vehicle speed Vc is lower than the first vehicle speed V1 and the front wheel side target travel amount is set to a prescribed first front wheel side target travel amount Lf1 when the vehicle speed Vc is higher than the second vehicle speed V2. In addition, when the vehicle speed Vc is equal to or higher than the first vehicle speed V1 and equal to or lower than the second vehicle speed V2, the front wheel side target travel amount is set to a value that gradually varies from zero to the first front wheel side target travel amount Lf1 as the vehicle speed Vc increases. Moreover, the first front wheel side target travel amount Lf1 is set to a travel amount that creates a maximum state of the front fork 13.

The rear wheel side target travel amount determining unit 572 calculates a rear wheel side target travel amount by, for example, substituting the vehicle speed Vc acquired by the vehicle speed acquiring unit 56 into a map which is empirically created in advance and stored in the ROM and which shows a correspondence between the vehicle speed Vc and the rear wheel side target travel amount such as that shown in FIG. 25B. In the example shown in FIG. 25B, the rear wheel side target travel amount is set to zero when the vehicle speed Vc is lower than the first vehicle speed V1 and the rear wheel side target travel amount is set to a prescribed first rear wheel side target travel amount Lr1 when the vehicle speed Vc is higher than the second vehicle speed V2. In addition, when the vehicle speed Vc is equal to or higher than the first vehicle speed V1 and equal to or lower than the second vehicle speed V2, the rear wheel side target travel amount is set to a value that gradually varies from zero to the first rear wheel side target travel amount Lr1 as the vehicle speed Vc increases. Moreover, the first rear wheel side target travel amount Lr1 is set to a travel amount that creates a maximum state of the rear suspension 22.

Also in a case with the motorcycle 1 according to the eighth embodiment which includes the electromagnetic valve control unit 57 configured as described above, the vehicle height can be steplessly changed with high accuracy in accordance with the vehicle speed.

Moreover, the front wheel side target travel amount determining unit 571 and the rear wheel side target travel amount determining unit 572 of the electromagnetic valve control unit 57 of the motorcycle 1 according to the eighth embodiment vary the target travel amount based on the vehicle speed Vc acquired by the vehicle speed acquiring unit 56 in a similar manner to the electromagnetic valve control unit 57 according to the second embodiment. However, this mode is not restrictive. For example, the front wheel side target travel amount determining unit 571 and the rear wheel side target travel amount determining unit 572 may vary the target travel amount based on a load detected by the load detecting sensor 33 in a similar manner to the electromagnetic valve control unit 57 according to the third embodiment or may vary the target travel amount based on the vehicle speed Vc and the load detected by the load detecting sensor 33 in a similar manner to the electromagnetic valve control unit 57 according to the fourth embodiment. Alternatively, the front wheel side target travel amount determining unit 571 and the rear wheel side target travel amount determining unit 572 may vary the target travel amount based on an operating position of the vehicle height adjusting switch 34 in a similar manner to the electromagnetic valve control unit 57 according to the fifth embodiment. In other words, the front wheel side target travel amount determining unit 571 and the rear wheel side target travel amount determining unit 572 may determine the front wheel side target travel amount and the rear wheel side target travel amount to be zero when the vehicle height adjusting switch 34 is set to the "low" position and may determine the front wheel side target travel amount and the rear wheel side target travel amount to be ½ of the first front wheel side target travel amount Lf1 (=Lf1/2), ½ of the first rear wheel side target travel amount Lr1 (=Lr1/2), the first front wheel side target travel amount Lf1, and the first rear wheel side target travel amount Lr1 when the vehicle height adjusting switch 34 is set to the "medium" and "high" positions. In this case, instead of the front wheel side relative position detecting unit 295 and the rear wheel side relative position detecting unit 195 which are so-called stroke sensors, a sensor that determines whether or not the front wheel side travel amount Lf and the rear wheel side travel amount Lr are zero, a sensor that determines whether or not the front wheel side travel amount Lf and the rear wheel side travel amount Lr are ½ of the first front wheel side target travel amount Lf1 and ½ of the first rear wheel side target travel amount Lr1, and a sensor that determines whether or not the front wheel side travel amount Lf and the rear wheel side travel amount Lr are the first front wheel side target travel amount Lf1 and the first rear wheel side target travel amount Lr1 may be provided, and the front wheel side PWM control unit 532 and the rear wheel side PWM control unit 542 may perform feedback control based on output values from these sensors.

REFERENCE SIGNS LIST 1 motorcycle
11 vehicle body frame
13 front fork
14 front wheel
21 rear wheel
22 rear suspension
50 control device
57 electromagnetic valve control unit
140 rear wheel side relative position changing device
160 rear wheel side liquid supplying device
170 rear wheel side electromagnetic valve
240 front wheel side relative position changing device
260 front wheel side liquid supplying device
270 front wheel side electromagnetic valve

What is claimed is:
1. A vehicle height adjusting device comprising:
a changing unit that includes a jack chamber in which a fluid is stored, said changing unit changing relative positions of a vehicle main body and wheels of a vehicle; and
a control unit that adjusts a vehicle height that is a height of the vehicle main body by controlling the changing unit to change the relative positions, wherein
the changing unit includes an electromagnetic valve that is provided on a circulation path of the fluid and that is adjusted to have an opening amount in accordance with supplied electric power and changes the relative positions as pressure of the fluid varies in accordance with the opening amount of the electromagnetic valve and an amount of the fluid stored in the jack chamber, and the control unit performs Pulse-Width-Modulation control on voltage applied to the electromagnetic valve so that the opening amount of the electromagnetic valve equals a desired opening amount.

2. The vehicle height adjusting device according to claim 1, wherein
the control unit controls the opening amount of the electromagnetic valve by changing a duty ratio of the voltage applied to the electromagnetic valve in response to a request made by a rider via an operating unit provided in the vehicle.

3. The vehicle height adjusting device according to claim 2, wherein
when the control unit maintains the vehicle height in a highest state, the control unit maintains the duty ratio of the voltage applied to the electromagnetic valve at a value that is less than 100%.

4. The vehicle height adjusting device according to claim 1, wherein
the control unit controls the opening amount of the electromagnetic valve by changing a duty ratio of the voltage applied to the electromagnetic valve in accordance with a load acting on the wheels from the vehicle main body.

5. The vehicle height adjusting device according to claim 4, wherein
when the control unit maintains the vehicle height in a highest state, the control unit maintains the duty ratio of the voltage applied to the electromagnetic valve at a value that is less than 100%.

6. The vehicle height adjusting device according to claim 1, wherein
the control unit controls the opening amount of the electromagnetic valve by changing a duty ratio of the voltage applied to the electromagnetic valve in accordance with a vehicle speed that is a travel speed of the vehicle.

7. The vehicle height adjusting device according to claim 6, wherein
when the control unit maintains the vehicle height in a highest state, the control unit maintains the duty ratio of the voltage applied to the electromagnetic valve at a value that is less than 100%.

8. The vehicle height adjusting device according to claim 1, wherein
when the control unit maintains the vehicle height in a highest state, the control unit maintains the duty ratio of the voltage applied to the electromagnetic valve at a value that is less than 100%.

9. The vehicle height adjusting device according to claim 1, wherein
the changing unit is a shock absorber, and
the electromagnetic valve is provided at one end portion of the shock absorber.

10. A method for adjusting a height of a vehicle, comprising the steps of:
controlling a changing unit including a jack chamber in which a fluid is stored and an electromagnetic valve that is provided on a circulation path of the fluid and that is adjusted to have an opening amount in accordance with supplied power;
changing relative positions of a vehicle main body and wheels of the vehicle as pressure of the fluid varies in accordance with the opening amount of the electromagnetic valve and an amount of the fluid stored in the jack chamber; and
performing Pulse-Width-Modulation control on voltage applied to the electromagnetic valve so that the opening amount of the electromagnetic valve equals a desired opening amount.

11. The method for adjusting a height of a vehicle according to claim 10, wherein
when the vehicle height is maintained in a highest state, the duty ratio of the voltage applied to the electromagnetic valve is maintained at a value that is less than 100%.

12. The method for adjusting a height of a vehicle according to claim 10, wherein
the changing unit is a shock absorber, and
the electromagnetic valve is provided at one end portion of the shock absorber.

* * * * *